(12) United States Patent
Maljkovic et al.

(10) Patent No.: US 8,362,114 B2
(45) Date of Patent: Jan. 29, 2013

(54) THERMOPLASTIC COMPOSITIONS CONTAINING MICROSPHERES

(75) Inventors: Nikica Maljkovic, New Orleans, LA (US); Shari A. Weinberg, Fulton, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 384 days.

(21) Appl. No.: 12/528,594

(22) PCT Filed: Feb. 26, 2008

(86) PCT No.: PCT/EP2008/052280
§ 371 (c)(1),
(2), (4) Date: Aug. 2, 2010

(87) PCT Pub. No.: WO2008/090235
PCT Pub. Date: Jul. 31, 2008

(65) Prior Publication Data
US 2010/0324171 A1   Dec. 23, 2010

Related U.S. Application Data

(60) Provisional application No. 60/892,043, filed on Feb. 28, 2007.

(51) Int. Cl.
*C08J 9/32* (2006.01)
(52) U.S. Cl. ........................................ 523/219
(58) Field of Classification Search .............. 523/219
See application file for complete search history.

(56) References Cited

U.S. PATENT DOCUMENTS

| | | | |
|---|---|---|---|
| 3,634,355 | A | 1/1972 | Barr et al. |
| 3,833,544 | A | 9/1974 | Takekoshi et al. |
| 3,887,588 | A | 6/1975 | Cook et al. |
| 3,965,125 | A | 6/1976 | Meyers |
| 4,008,203 | A | 2/1977 | Jones |
| 4,017,511 | A | 4/1977 | Williams |
| 4,024,110 | A | 5/1977 | Takekoshi |
| 4,108,837 | A | 8/1978 | Johnson et al. |
| 4,175,175 | A | 11/1979 | Johnson et al. |
| 4,661,301 | A | 4/1987 | Okada et al. |
| 5,051,483 | A | 9/1991 | Rock et al. |
| 5,691,390 | A | 11/1997 | Harrison et al. |
| 6,482,880 | B1 | 11/2002 | Rock |
| 6,495,615 | B1 | 12/2002 | Gallucci |
| 6,566,458 | B2 | 5/2003 | Duncan et al. |
| 6,593,445 | B2 | 7/2003 | Schwab |
| 6,815,483 | B2 | 11/2004 | Takekoshi |
| 2003/0129763 | A1 | 7/2003 | Chamberlain et al. |
| 2006/0105053 | A1 | 5/2006 | Marx et al. |
| 2006/0122049 | A1 | 6/2006 | Marshall et al. |
| 2006/0210788 | A1 | 9/2006 | Campbell et al. |

FOREIGN PATENT DOCUMENTS

| | | |
|---|---|---|
| EP | 1529810 A1 | 5/2005 |
| WO | WO 2004081103 A2 | 9/2004 |
| WO | WO 2005066251 A1 | 7/2005 |
| WO | WO 2005066262 A1 | 7/2005 |
| WO | WO 2005092961 A2 | 10/2005 |
| WO | WO 2006071599 A1 | 7/2006 |
| WO | WO 2006118901 A1 | 11/2006 |

OTHER PUBLICATIONS

Standard ASTM D 3102-72, 1972, Discontinued standard method of test for hydrostatic collapse strength of hollow glass microspheres, p. 1073-1076 (4 pp.).
Federal Register vol. 51, No. 139, p. 26206-26221, DOT FAA Title 14 Code of Federal Regulations, Jul. 21, 1986, (Title 14 CFR Part 25—Amendment 25-61), accessed online on Aug. 25, 2009 via Internet site : http://rgl.faa.gov/Regulatory_and_Guidance_Library/rgFinalRule.nsf/0/d66c1649c9833fb9862572440071c28e/$FILE/Amendment%2025-61.pdf. (17 pp.).
Federal Register vol. 51, No. 152, p. 28322, DOT FAA Title 14 Code of Federal Regulations, Aug. 7, 1986 (Title 14 CFR Part 25—Amendment 25-61), accessed online on Aug. 25, 2009 via Internet site : http://rgl.faa.gov/Regulatory_and_Guidance_Library/rgFinalRule.nsf/0/d66c1649c9833fb9862572440071c28e/$FILE/Amendment%2025-61.pdf. (1 pp.).
Code of Federal Regulations, Title 14, Part 25, Airworthiness Standards : Transport Category Airplanes,—last amended on Oct. 27, 2004, list of sections, retrieved online on Mar. 26, 2009 via Internet site: http://ecfr.gpoaccess.gov/cgi/text/text-idx?c=ecfr&sid=81df95bda6486464109af2024415a6c5&rgn=div5& view=text& node=14:1.0.1.3.11&idno=14#14:1.0.1.3.11.4.181.74 (10 pp.).
Boeing Document D6-51377, Revision F, May 2006, Airplane fireworthiness design criteria—Pressurized compartments (48 pp.).
Aircraft Industries Internal Test Methods and Guidelines, Appendix E of Aircraft Materials Fire Test Handbook updated May 18, 2006, accessed online on Aug. 29, 2009 via Internet site: http://www.fire.tc.faa.gov/pdf/handbook/00-12_apF-0209.pdf (1 pp.).
Federal Aviation Regulation FAR 25.853 Compartment interiors,—last amended on Oct. 27, 2004, Appendix F, Part I Test Criteria and Procedures for Showing Compliance with §25.853, 13 pgs., retrieved online on Mar. 26, 2009 via Internet site: http://ecfr.gpoaccess.gov/cgi/t/text/text-idx?c=ecfr&sid=81df95bda6486464109af2024415a6c5&rgn=div5& view=text& node=14:1.0.1.3.11&idno=14#14:1.0.1.3.11.4.181.74 (13 pp.).
Federal Aviation Regulation FAR 25.853 Compartment interiors,—last amended on Oct. 7, 2004, Appendix F, Part IV, Test Method To Determine the Heat Release Rate From Cabin Materials Exposed to Radiant Heat, p. 1-19 retrieved online on Mar. 26, 2009 via Internet site: http://ecfr.gpoaccess.gov/cgi/t/text/text-idx?c=ecfr&sid=81df95bda6486464109af2024415a6c5&rgn=div5& view=text& node=14:1.0.1.3.11&idno=14#14:1.0.1.3.11.4.181.7 (19 pp.).

(Continued)

*Primary Examiner* — Edward Cain
(74) *Attorney, Agent, or Firm* — Oblon, Spivak, McClelland, Maier & Neustadt, L.L.P.

(57) ABSTRACT

A composition including a poly(biphenylether sulfone) and microparticles. A composition including a poly(aryl ether sulfone), a polyetherimide and/or a polycarbonate, and high crush strength glass hollow microspheres having a crush strength greater than 15,000 psi. Articles made from the compositions. Aircrafts, cars and other vehicles comprising compounds made from the compositions.

21 Claims, No Drawings

OTHER PUBLICATIONS

Federal Aviation Regulation FAR 25.853 Compartment interiors,—last amended on Oct. 27, 2004, Appendix F, Part V, Test Method To Determine the Smoke Emission Characteristics of Cabin Materials, p. 1-12 retrieved online on Mar. 26, 2009 via Internet site: http://ecfr.gpoaccess.gov/cgi/t/txt/text-idx?c=ecfr&sid=81df95bda6486464109af2024415a6c5&rgn=div5&view=text& node=14:1.0.1.3.11&idno=14#14:1.0.1.3.11.4.181.7 (12 pp.).

Boeing Specification Support Standard BSS 7238, Revision C, 19970626, Test Method for Smoke Generation by Materials on Combustion, Rev.(C) Jun. 26, 1997, p. 1-19 (19 pp.).

Boeing Specification Support Standard BSS 7239, Revision A, 19880118, Test Method for Toxic Gas Generation by Materials on Combustion, Rev. (A) Jan. 18, 1988, p. 1-12 (12 pp.).

DOT/FAA/AR-00/12, Aircraft Materials Fire Test Handbook, Apr. 2000, Federal Aviation Administration (236 pp.)—document submitted via EFS in two parts: Part I (114 pp.) and Part II (122 pp.).

Solvay Advanced Polymers, Radel A Polyethersulfone, Radel R Polyphenylsulfone—Design Guide, R-50247, 2004 (67 pp.).

Standard ASTM D 2840-69, 1969, Standard method of test for average true particle density of hollow microspheres, Aug. 7, 2008 (2 pp.).

U.S. Appl. No. 60/866,332, filed Nov. 17, 2006, by Schwab.

THERMOPLASTIC COMPOSITIONS CONTAINING MICROSPHERES

CROSS-REFERENCE TO RELATED APPLICATIONS

This application is a U.S. national stage application under 35 U.S.C. §371 of International Application No. PCT/EP2008/052280 filed Feb. 26, 2008, which claims priority to U.S. provisional application No. 60/892,043, filed Feb. 28, 2007, the whole content of which is each of these applications being herein incorporated by reference for all purposes.

FIELD OF THE INVENTION

The invention is related to thermoplastic compositions that contain glass and/or ceramic microspheres, and one or more of a poly(aryl ether sulfone), a polycarbonate and a polyetherimide. The invention further relates to methods of manufacturing the thermoplastic compositions, articles made from the thermoplastic compositions, and methods of using the thermoplastic compositions.

DESCRIPTION OF THE RELATED ART

Poly(arylether sulfone)s are polymers that have repeating or recurring —$SO_2$— groups, aryl groups and ether groups.

Well known and commercially available polysulfones include polysulfones (also called bisphenol A polysulfones), polyethersulfones, polyetherethersulfones and poly(biphenylether sulfone)s; polyphenylsulfones are a class of poly(biphenylether sulfone)s.

Polysulfones are available commercially from Solvay Advanced Polymers under the tradename UDEL®. Polysulfones typically have high glass transition temperature (e.g., about 185° C.), high strength and toughness.

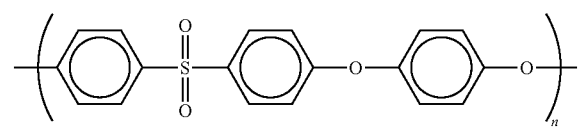

RADEL® R is a polyphenylsulfone available from Solvay Advanced Polymers. The chemical structure of a RADEL R polyphenylsulfone is shown below.

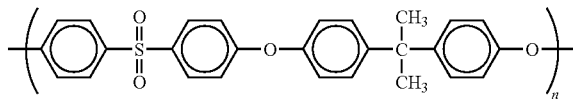

RADEL® A poly(arylether sulfone)s, available from Solvay Advanced Polymers, are polyethersulfone-polyethereethersulfone copolymers, wherein the polyethersulfone and polyetherethersulfone chemical structures are shown

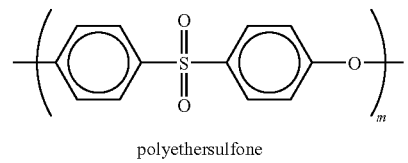

polyethersulfone

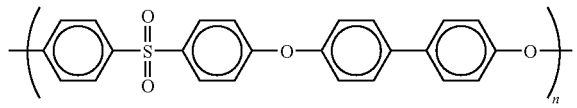

polyetherethersulfone

Poly(arylether sulfone)s in general and poly(biphenylether sulfone)s in particular are typically amorphous and do not melt crystallize. Due to their high strength and heat resistance, certain polysulfones may be used in high-stress environments where other polymers such as polycarbonate (PC) may degrade or may otherwise be unsuitable. Poly(arylether sulfone)s provide good chemical resistance such as resistance to cleaning fluids; processability in the melt phase including injection molding and extrusion; and ease of colorability.

Poly(arylether sulfone)s, and poly(biphenylether sulfone)s in particular, are particularly well suited for aircraft applications where toughness, resistance to thermal degradation including flame resistance, lightness and strength are key properties. Poly(arylether sulfone)s are used in many aircraft applications including, for example, passenger service units, staircases, window reveals, ceiling panels, information displays, window covers, ceiling panels, sidewall panels, wall partitions, display cases, mirrors, sun visors, window shades, storage bins, storage doors, ceiling overhead storage lockers, serving trays, seat backs, cabin partitions, and ducts.

Other thermoplastic materials that have been used in aeronautical applications include polycarbonate polymers and polyetherimide polymers. Representative commercially available polycarbonates include MAKROLON®, LEXAN® and CALIBRE® polycarbonates.

Representative commercially available polyetherimides include the ULTEM® materials available from GE Plastics. A representative structure of a polyetherimide is shown below.

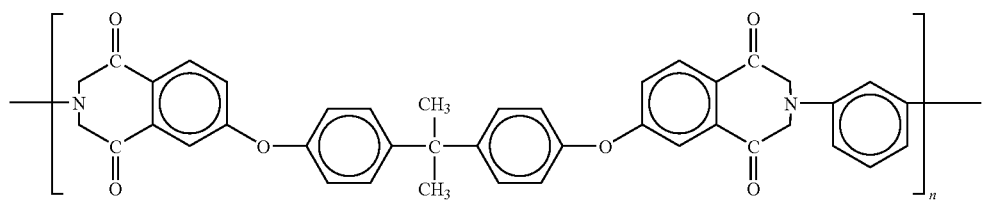

In aircraft applications it is desirable to maximize weight reduction in a manner that does not compromise the strength and/or chemical properties of any component manufactured from a thermoplastic material. One way to reduce the weight of a particular aircraft component is to manufacture the component from a material having a relatively low density. By lowering the density of the materials used to make aircraft parts, improved weight/strength performance can be achieved. Of course, any reduction in weight may not come at the expense of a significant reduction in strength and/or chemical properties. Flammability characteristics are especially important in aircraft applications and any weight reductions must not result in poorer thermal degradation characteristics.

Thermal degradation characteristics are important considerations when specifying thermoplastic materials for use in aircraft applications. To be permitted for use inside aircraft, engineering thermoplastics, including poly(aryl ether sulfone)s, polysulfones, polycarbonates and polyetherimides, must meet certain requirements for flame resistance (e.g., flame retardancy) and heat release during combustion. Airworthiness standards issued by the U.S. government and codified in Title 14 Code of Federal Regulations (51 Federal Register 26206, Jul. 21, 1986 and 51 Federal Register 28322, Aug. 7, 1986) provide flammability standards based on heat calorimetry testing. The airworthiness standards of Title 14 of the CFR are incorporated by reference herein in their entirety.

The heat calorimetry testing methodology used to determine whether an engineering thermoplastic meets U.S. government airworthiness standards were developed at Ohio State University and are known as the OSU Flammability Test. The OSU tests measure the two minute total heat release (THR) and peak heat release (HRR) in kilowatt minutes per square meter of surface area, i.e., $kW \cdot min/m^2$, and kilowatt per square meter of surface area, i.e., $kW/m^2$, respectively, for the first five minutes of a burn test under the conditions of the OSU testing.

The most recent airworthiness standards, enacted in 1990, for engineering thermoplastics require that both THR and HRR have values of 65 or less for both THR and HRR. Some poly(aryl ether sulfone) materials such as poly(phenylether sulfone) meet current airworthiness standards; however, when used as a blend with other polymers the THR and/or HRR thresholds mandated by the aircraft industry and the federal government may be exceeded. Moreover, in the future, airworthiness standards are likely to become stricter, e.g., leading to a further lowering of permissible maximum THR and/or HRR values. Further improvements in the flame resistance/flame retardancy and thermal release properties of thermoplastic materials are desirable to improve aircraft safety and to permit continued use of poly(aryl ether sulfone), poly(biphenyl ether sulfone)s, polysulfones, polycarbonates, and polyetherimides in aircraft applications.

Many aircraft parts are formed from thermoplastic materials such as poly(aryl ether sulfone), polysulfones, polycarbonate and/or polyetherimides. The density of such thermoplastic compositions may be reduced by using the thermoplastic material in the form of a foam and/or mixing the thermoplastic material with a filler having a relatively lower density than the thermoplastic material. The form, e.g., foamed or non-foamed, and composition, e.g., filled or unfilled, can affect the thermal degradation properties of thermoplastic materials.

The use of filled poly(aryl ether sulfone)-based compositions is known. Typically, when using a filler, the filler is mixed with the thermoplastic material under conditions at which the thermoplastic material is in a molten form. The resulting filled thermoplastic material is then extruded to provide a thermoplastic composition wherein the filler is homogeneously dispersed.

Fillers such as glass fibers, calcium carbonate and aluminum trihydroxide (ATH) have been used to provide polysulfone compositions having certain desirable physical properties. Most conventional fillers are inorganic materials that have a relatively higher density than most thermoplastic materials. However, organic fillers such a carbon fibers and polyaramid fibers may also be used; however, these fillers have densities that are similar to the densities of the thermoplastic materials with which they are mixed. Further, while the inclusion of conventional fillers may be useful for modifying and/or improving the physical properties of a thermoplastic composition, such fillers typically are unable to lower the relative density of the thermoplastic composition while concurrently providing improved physical and/or characteristics. Certain fillers may be used to improve the resistance to thermal degradation properties of thermoplastic materials. For example, fillers such as zinc borate, fluoropolymers, and antimony oxide may be used; however, such fillers are typically no less dense than poly(aryl ether sulfone)s and in many cases are substantially denser.

Microparticles, especially hollow microparticles, may have substantially lower densities than the conventional inorganic (e.g., glass) or ceramic materials from which they are made. Hollow microparticles may be especially useful for reducing the density of thermoplastic materials. Hollow microparticles typically have an outer shell made from a glass or ceramic material and an empty inner core that contains only gas. While the density of a glass material such as soda lime borosilicate glass is about 2.2 $g/cm^3$, the density of hollow glass microparticles (also known as glass microbubbles) made from soda lime borosilicate glass may be as low as 0.1 $g/cm^3$. In comparison the density of most thermoplastic polymers is about 0.9-1.4 $g/cm^3$. Thermoplastic material-based compositions containing microparticles may therefore have a lower density than the pure thermoplastic material.

The physical and chemical properties of hollow microparticles can vary substantially depending on the structure, origin and/or composition of the microparticle. The strength of hollow microparticles can be measured by their crush strength. For example, glass microspheres having relatively thicker glass walls may have a substantially higher resistance to crushing in comparison to thin-walled glass microspheres. Further, the surface of microparticles may be modified chemically with, for example, agents such as silanes and/or epoxies which improve the microparticle's compatibility and binding with thermoplastic materials. Likewise, hollow microparticles may be coated with powders such as fine silica powder to improve flowability and/or compatibility with a thermoplastic matrix.

The use of hollow microparticle-containing polymer compositions in applications such as printed circuit boards was described in U.S. Pat. No. 4,661,301 which discloses the use of glass microspheres having a diameter of from 20 to 150 µm in epoxy resin compositions (e.g., thermosetting compositions). The resulting cured epoxy was shown to have a relatively lower dielectric constant in comparison to the corresponding unfilled or fiber-filled epoxy compositions.

WO 2005/092961 describes compositions that contain both fiber reinforcing fillers and hollow microspheres. The relative density of the thermoplastic polymer composition was reduced by including the glass microspheres and some, but not all, of the physical properties of the underlying thermoplastic material were shown to be substantially the same.

WO 2006/071599 describes polytetrafluoroethylene compositions that include glass microspheres. The relative specific gravity of the compositions are less than the specific gravity of the pure polytetrafluoroethylene. Physical properties such as tensile strength and tensile elongation are similar to the physical properties of the pure polytetrafluoroethylene material, however somewhat lowered.

U.S. 2006/0105053 describes compositions of block copolymers and microspheres. The block copolymers are olefin-based. The inclusion of glass microspheres provided compositions having physical properties similar to the physical properties of the base block copolymer.

U.S. 2006/0129763 describes the use of hollow microparticles as a means for measuring stress in polymeric compositions. Poly(biphenylether sulfone) based compositions containing hollow glass microspheres are not described nor are polysulfone compositions containing ultra high crush strength glass microbubbles.

Compositions that include a poly(biphenyl ether sulfone) and at least one of glass or ceramic microspheres and/or microbubbles have not been described. Moreover, although conventional microsphere-containing thermoplastic compositions have been shown to exhibit only somewhat reduced strength, the requirements of the aircraft industry for high strength and low weight have not yet been satisfactorily addressed. Likewise, thermoplastic polymer compositions that contain any of a siloxane-reinforced polycarbonate, a polyetherimide, and/or a polysulfone, and ultra high crush strength hollow glass microspheres have not been described.

Thus, there is a need for filled, thermoplastic polymer-based compositions, especially poly(aryl ether sulfone) compositions, that have good flame resistance and flame retardance characteristics and that exhibit substantially unchanged strength, lower density, and improved physical and chemical properties such as tensile strength, tensile elongation, flame retardency and thermal release on combustion.

SUMMARY OF THE INVENTION

Accordingly in a first aspect of the invention, in order to address the above noted deficiencies of conventional poly (aryl ether sulfone) compositions, and to provide poly(aryl ether sulfone) compositions having low density and improved physical and chemical properties, it is one object to provide poly(aryl ether sulfone)-based compositions that contain a poly(biphenyl ether sulfone) and microparticles.

Another object of the invention is to provide poly(aryl ether sulfone)-based compositions that contain a poly(biphenyl ether sulfone) and hollow microparticles.

Another object of the invention is to provide poly(aryl ether sulfone)-based compositions that contain a poly(biphenyl ether sulfone) and glass microspheres.

Another object of the invention is to provide poly(aryl ether sulfone)-based compositions that contain a poly(biphenyl ether sulfone) and ceramic microspheres.

Another object of the invention to provide polysulfone-based compositions that contain a poly(biphenyl ether sulfone), hollow microparticles and a flame retardant additive.

Another object of the invention is to provide poly(aryl ether sulfone)-based compositions that contain a poly(biphenyl ether sulfone) and glass microspheres, and have a tensile strength of 8,000-12,000 psi.

Another object of the invention is to provide poly(aryl ether sulfone)-based compositions that contain a poly(biphenyl ether sulfone) and glass microspheres, and have a tensile modulus of 300,000-500,000 psi.

Another object of the invention is to provide poly(aryl ether sulfone)-based compositions that contain a poly(biphenyl ether sulfone) and glass microspheres, and have a flame retardance of V-0 for ⅟32" bars.

Another object of the invention is to provide poly(aryl ether sulfone)-based compositions that contain a poly(biphenyl ether sulfone) and glass microspheres, and have a thermal release of less than 55 KW/m².

Another object of the invention is to provide poly(aryl ether sulfone) compositions that include a poly(biphenyl ether sulfone) and one or more fillers or additives.

In a second aspect of the invention it is an object to provide poly(aryl ether sulfone)-based compositions that contain a poly(aryl ether sulfone) and hollow glass microspheres having very high crush strength.

Another object of the invention is to provide poly(aryl ether sulfone)-based compositions that contain a poly(aryl ether sulfone) and hollow glass microspheres having very high crush strength, and have a tensile strength of 8,000-12,000 psi.

Another object of the invention is to provide poly(aryl ether sulfone)-based compositions that contain a poly(aryl ether sulfone) and hollow glass microspheres having very high crush strength, and have a tensile modulus of 300,000-500,000 psi.

Another object of the invention is to provide poly(aryl ether sulfone)-based compositions that contain a poly(aryl ether sulfone) and hollow glass microspheres having very high crush strength, and have a flame retardance of V-0 for ⅟32" bars.

Another object of the invention is to provide poly(aryl ether sulfone)-based compositions that contain a poly(aryl ether sulfone) and hollow glass microspheres having very high crush strength, and have a thermal release of less than 55 KW/m².

Another object of the invention is to provide poly(aryl ether sulfone) compositions that include a poly(biphenyl ether sulfone) and one or more fillers or additives.

In a third aspect of the invention, it is one object to provide thermoplastic polymer based compositions that contain a polycarbonate polymer and/or a polyetherimide polymer, and hollow glass microparticles having very high crush strength.

Another object of the invention is to provide polycarbonate-based compositions that contain a polycarbonate and glass microspheres having very high crush strength.

Another object of the invention is to provide polyetherimide-based compositions that contain a polyetherimide and glass microspheres having very high crush strength.

Another object of the invention to provide a polycarbonate- and/or a polyetherimide-based composition containing hollow glass microparticles having very high crush strength and a flame retardant additive.

Another object of the invention is to provide a polycarbonate- and/or a polyetherimide-based composition that contains hollow glass microspheres having very high crush strength, and has a tensile strength of 8,000-12,000 psi.

Another object of the invention is to provide a polycarbonate- and/or a polyetherimide-based composition that contains hollow glass microspheres having very high crush strength, and has a tensile modulus of 300,000-500,000 psi. Another object of the invention is to provide a polycarbonate- and/or a polyetherimide-based composition that contains hollow glass microspheres having very high crush strength, and has a flame retardance of V-0 for ⅟32" bars.

Another object of the invention is to provide a polycarbonate- and/or a polyetherimide-based composition that contains hollow glass microspheres having very high crush strength, and has a thermal release rate of less than 55 KW/m².

Another object of the invention is to provide a polycarbonate- and/or a polyetherimide-based composition that contains hollow glass microspheres having very high crush strength and one or more fillers or additives.

DETAILED DESCRIPTION OF THE PREFERRED EMBODIMENTS

First Aspect of the Invention

A first aspect of the invention includes thermoplastic compositions that contain a poly(biphenyl ether sulfone) and microparticles which may be hollow.

The Poly(Biphenyl Ether Sulfone)

For the purpose of the invention, a poly(biphenyl ether sulfone) is intended to denote a polycondensation polymer of which more than 50 wt. % of the recurring units are recurring units of one or more formulae containing at least one optionally substituted p-biphenylene group:

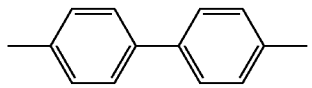

at least one ether group (—O—) and at least one sulfone group (—SO$_2$—).

The biphenylene unit may be unsubstituted, or it may be substituted by one or more substituents; the substituent(s) may be notably chosen from halogen atoms, $C_1$-$C_{12}$ alkyls, $C_1$-$C_{24}$ alkylaryls, $C_1$-$C_{24}$ aralkyls, $C_6$-$C_{18}$ aryls, and $C_1$-$C_{12}$ alkoxy groups; preferred substituents are halogen atoms, in particular fluorine atoms.

Usually, more than 50 wt. % of the recurring units of the poly(biphenyl ether sulfone) are recurring units of one or more formulae containing at least one optionally p-biphenylene group:

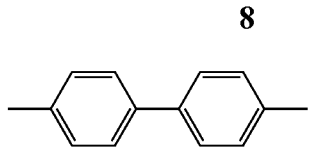

as above detailed, and at least one diphenyl sulfone group:

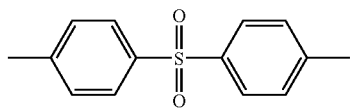

Each of the phenylene units of the diphenyl sulfone group may be, independently from each other, unsubstituted, or they may be substituted by one or more substituents; the substituent(s) may be notably chosen from halogen atoms, $C_1$-$C_{12}$ alkyls, $C_1$-$C_{24}$ alkylaryls, $C_1$-$C_{24}$ aralkyls, $C_6$-$C_{18}$ aryls, and $C_1$-$C_{12}$ alkoxy groups; preferred substituents are halogen atoms, in particular fluorine atoms.

Preferably, the poly(biphenyl ether sulfone) has one or more recurring units having the following formula (1):

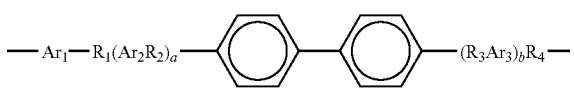

(1)

where $R_1$ through $R_4$ are any of —O—, —SO$_2$—, —S—, or —CO—, with the proviso that at least one of $R_1$ through $R_4$ is —SO$_2$— and at least one of $R_1$ through $R_4$ is —O—; $Ar_1$, $Ar_2$ and $Ar_3$ are arylene groups containing 6 to 24 carbon atoms, and are preferably phenylene or p-biphenylene; and a and b are either 0 or 1.

More preferably, the recurring units of the poly(biphenyl ether sulfone) are chosen from the following formulas (2)-(6)

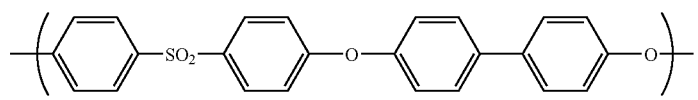

(2)

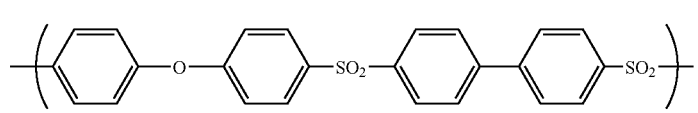

(3)

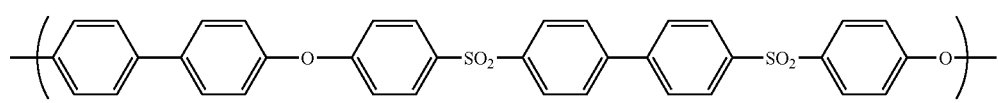

(4)

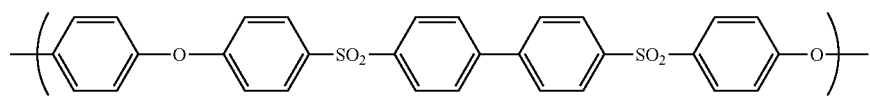

(5)

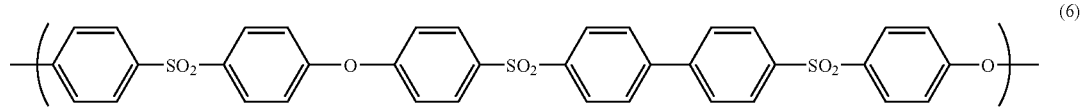

(6)

Still more preferably, the recurring units of the poly(biphenyl ether sulfone) are selected from the poly(biphenyl ether sulfone)s of formulas (2) or (4), or a mixture of the recurring units of formula (4) and (6) described above.

Preferably, the poly(biphenyl ether sulfone) consists of recurring units of formula (4) and (6) where the recurring unit (6) is present in an amount of from 10 to 99% by weight, preferably between 50 and 95% by weight, based on the total weight of the recurring units of (4) and (6).

The poly(biphenyl ether sulfone) may be a poly(biphenylether diphenylsulfone) polycondensation polymer of which more than 50 wt. % of the recurring units are recurring units of condensed molecules of a dihydroxybiphenyl group and a diphenyl sulfone group. A poly(biphenyl ether sulfone) that has recurring units of formula (2), i.e., condensed units of 4,4'-dihydroxybiphenyl and 4,4'-dichlorodiphenyl sulfone provides, in general, the best overall balance of cost and toughness.

A poly(biphenyl ether sulfone) that has recurring units of formula (4) or mixtures of recurring units of formula (4) and (6) provides a poly(biphenyl ether sulfone) with an especially high glass transition temperature. A poly(biphenyl ether sulfone) that includes a mixture of recurring units of formula (4) and (6) may provide substantially the same level of physical and chemical properties of a poly(biphenyl ether sulfone) that consists of recurring units of formula (4), but at a somewhat more attractive cost.

The poly(biphenyl ether sulfone) may be a homopolymer, a random copolymer, an alternating copolymer or a block copolymer. The compositions of the invention may contain any combination of one or more of a poly(biphenyl ether sulfone) homopolymer, a poly(biphenyl ether sulfone) random copolymer, a poly(biphenyl ether sulfone) alternating copolymer, and a poly(biphenyl ether sulfone) block copolymer.

The poly(biphenyl ether sulfone) of the invention may have a block structure wherein a first repeating unit and a second repeating unit appear in an irregular but predictable repeating or recurring manner, e.g., in blocks. For example, a block may contain at least two of the same recurring units or a combination of different recurring units bonded together wherein the bonded recurring units appear at intervals in the poly(biphenyl ether sulfone). The poly(biphenyl ether sulfone) may be a copolymer in a block form having first blocks made up of recurring units consisting of only one type of biphenyl group and only one type of diphenyl sulfone, and second blocks that contain one or more recurring units that consist of biphenyl and/or diphenyl sulfone units that are different from the biphenyl and/or diphenyl sulfone units of the first block of recurring units. The poly(biphenyl ether sulfone) may contain polymerized blocks of a first recurring unit that are randomly distributed among groups of randomly polymerized second recurring units.

The poly(biphenyl ether sulfone) may be a copolymer that is a random copolymer having at least two different recurring units appearing randomly in the polymer chain. In an embodiment of the invention the poly(biphenyl ether sulfone) has at least three different repeating or recurring units that are distributed randomly throughout the poly(biphenyl ether sulfone).

In one embodiment of the invention the poly(biphenyl ether sulfone) contains portions of random structures and portions of block structures. The random portion of the poly(biphenyl ether sulfone) is a portion wherein different sulfone units are randomly distributed between recurring units having biphenyl-containing units (e.g., derived from dihydroxybiphenyl molecules) that may be the same or different.

The poly(biphenyl ether sulfone) may have a structure that is from 0 to 100 wt. % random and from 0 to 100 wt. % block where wt. % is % by weight based on the total weight of the poly(biphenyl ether sulfone) (co)polymer. Preferably, when in co-polymer form, the poly(biphenyl ether sulfone) has from 20 to 80 wt. % random structure and from 80 to 20 wt. % block structure, more preferably from 30 to 70 wt. % random structure and from 70 to 30 wt. % block structure, more preferably from 40 to 60 wt. % random structure and from 60 to 40 wt. % block structure, most preferably the polysulfone co-polymer has about 50 wt. % random structure and about 50 wt. % block structure.

The random/block structure ratio of the poly(biphenyl ether sulfone) may be determined by using $^1H$ and $^{13}C$ NMR spectroscopy techniques. Specifically, 2D NMR spectroscopy including $^1H$-$1H$ COSY, $^1H$-$^{13}C$ HSQC, $^1H$-$^{13}C$ HMBC and 1D-$^1H$ and $^{13}C$ NMR techniques.

When the poly(biphenyl ether sulfone) is a copolymer, its recurring units may include (i) recurring units of at least two different formulae chosen from formulae (2) to (6) described above, or (ii) recurring units of one or more formulae (2) to (6) in addition to one or more different recurring units such as the units of formulas (7)-(10):

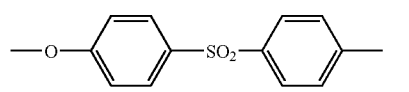           (7)

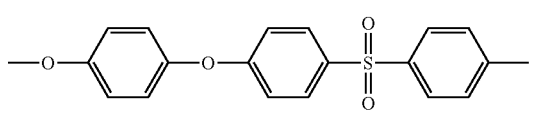           (8)

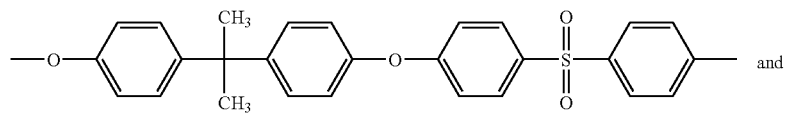    and    (9)

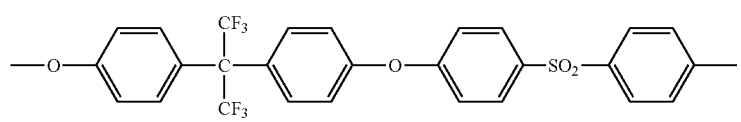           (10)

As examples of random copolymers, the poly(biphenyl ether sulfone) may be any of a block random copolymer and a random copolymer having a mixture of recurring units of formulas (2) and (10) described above.

Preferably more than 70 wt. %, more preferably more than 85 wt. % of the recurring units of the poly(biphenyl ether sulfone) are recurring units consisting of a diphenyl sulfone group and a biphenyl group such as the recurring units of formulas (1)-(6). Still more preferably, essentially all of the recurring units of the poly(biphenyl ether sulfone) are recurring units having a diphenyl sulfone group and a biphenyl group such as the recurring units of formulas (1)-(6). Most preferably, all of the recurring units of the poly(biphenyl ether sulfone) are recurring units having a diphenyl sulfone group and a biphenyl group, such as the recurring units of formulas (1)-(6).

Excellent results are in general obtained when the poly (biphenyl ether sulfone) is a poly(biphenylether sulfone) homopolymer, e.g., a polymer wherein all, or substantially all, of the recurring units are of formula (2). RADEL® R poly(biphenylether sulfone) from Solvay Advanced Polymers, L.L.C. is an example of such a poly(biphenylether sulfone) homopolymer that is commercially available.

In some applications where the poly(biphenyl ether sulfone) is subjected to very high temperature, excellent results are obtained when the poly(biphenyl ether sulfone) is a homopolymer of recurring units of formula (4), i.e., a polymer wherein all, or substantially all, of the recurring units are of formula (4). In such high temperature applications, excellent results are also obtained when the poly(biphenyl ether sulfone) is a copolymer of which all, or substantially all, of the recurring units are of formulae (4) and (6).

The composition of the invention can comprise one and only one poly(biphenyl ether sulfone). Alternatively, it can comprise two, three, or even more than three poly(biphenyl ether sulfone)s. Mixtures of certain poly(biphenyl ether sulfone)s are preferred. For example a mixture consisting of (i) at least one poly(biphenyl ether sulfone) of which more than 50 wt. % of the recurring units, preferably essentially all the recurring units, and still more preferably all the recurring units are of formula (2) described above, (ii) at least one poly(biphenyl ether sulfone) of which more than 50 wt. % of the recurring units, preferably substantially all of the recurring units, and still more preferably all the recurring units are of formula (4) described above, and, optionally, in addition (iii) at least one other poly(biphenyl ether sulfone) different from the poly(biphenyl ether sulfone)s (i) and (ii), where wt. % is based on the total weight of all of the poly(biphenyl ether sulfone)s.

Preferably the composition comprises poly(biphenyl ether sulfone) mixtures consisting of (i) at least one poly(biphenyl ether sulfone) of which substantially all, if not all, the recurring units are of formula (2), or (ii) at least one poly(biphenyl ether sulfone) of which substantially all, if not all, the recurring units are of formula (4).

Still more preferably, the composition is a binary mixture of poly(biphenyl ether sulfone)s consisting of (i) one poly(biphenyl ether sulfone) of which all the recurring units are of formula (2), and (ii) one poly(biphenyl ether sulfone) of which all the recurring units are of formula (4).

Still more preferably the composition comprises mixtures consisting of (i) at least one poly(biphenyl ether sulfone) of which more than 50 wt. % of the recurring units are of formula (2), preferably consisting essentially of recurring units of formula (2), and still more preferably consisting of recurring units of formula (2), and (ii) at least one poly(biphenyl ether sulfone) of which more than 50 wt. % of the recurring units are of formula (4) and (6), preferably consisting essentially of recurring units of formula (4) and (6), and still more preferably consisting of recurring units of formulae (4) and (6), wherein the amount of the recurring units (6) contained in the mixture, based on the total weight of the recurring units (4) and (6), is between 10 and 99 wt. %, and preferably between 50 and 95 wt. %, and, optionally, in addition (iii) at least one other poly(biphenyl ether sulfone) different from the poly(biphenyl ether sulfone)s (i) and (ii).

The composition preferably comprises at least 50 wt. % of poly(biphenyl ether sulfone)s, more preferably at least 60%, at least 70%, at least 80%, at least 90%, at least 95%, at least 99% by weight of poly(biphenyl ether sulfone)s where % by weight is based on the total weight of the composition. The composition preferably comprises from 1 to 50% by weight of the microparticles of the invention, preferably from 5 to 45%, 10 to 40%, 15 to 35%, 20 to 30% and about 25% by weight of microparticles of the invention.

The compositions of the invention may be in different physical form. Preferably the compositions of the invention are homogeneous mixtures of the microparticles and the poly (biphenyl ether sulfone)s. The homogeneous mixture may be solid mixtures wherein the microparticles are homogenously distributed in a matrix that includes a homogenous distribution of the of the poly(biphenyl ether sulfone)s. Alternately, the compositions of the invention may be a liquid mass of the poly(biphenyl ether sulfone)s in which the microparticles are homogenously distributed, e.g., by mixing or kneading such as by extrusion or melt pumping.

In addition to the poly(biphenyl ether sulfone) and the microparticles of the invention, the composition of the invention may further comprise one or more polymers such as a poly(aryl ether sulfone), polysulfone, polyetherimide, a polycarbonate, a poly(aryletherketone), a poly(etheretherketone), a liquid crystalline polymer and/or blends thereof. The composition may further comprise additional components such as flame retardants, release agents, and additives which function, inter alia, to lower to the melt viscosity of the composition of the invention.

Additives which improve the flame resistance and/or flame retardance properties of thermoplastic materials may also be included in the composition. Conventional flame retardants, including inorganic additives such as $TiO_2$, ZnO, zinc borate, antimony oxide, carbon black and materials such as triphenyl phosphate or melamine cyanurate, may be included. Fluorocarbon resins such as polytetrafluoroethylene may also be used to improve the flame retardance, flame resistance and thermal release properties of the composition. Other additives such as dyes, pigments, colorants, fiberglass and/or carbon fiber may also be included.

In one embodiment of the invention, a poly(aryl ether sulfone) copolymer containing units of a fluorinated biphenyl and a diphenyl sulfone is present in the composition. Any of the at least partially fluorinated polysulfone copolymers described in U.S. provisional application No. 60/866,332, incorporated herein by reference in its entirety, may be used.

Preferred poly(biphenyl ether sulfone)s include the RADEL® R polyphenylsulfones available from Solvay Advanced Polymers, e.g., RADEL R-5000, RADEL R-5100, RADEL R-5500, and RADEL R-5800.

The poly(biphenyl ether sulfone)s of the invention may have repeating or recurring units of sulfone units different from recurring units made from a diphenyl sulfone and a biphenyl-containing group. Less than 50% of the recurring units of the poly(biphenyl ether sulfone) may be monomer units other monomer units made from a biphenyl compound such as 4,4'-biphenol and a diphenyl sulfone such as 4,4'-diphenyl sulfone. See the description above, when the poly(biphenyl ether sulfone) is a copolymer, its recurring units may include (i) recurring units of at least two different formulae chosen from formulae (2) to (6) described above, or (ii) recurring units of one or more formulae (2) to (6) in addition to one or more different recurring units such as the units of formulas (7)-(10). The poly(biphenyl ether sulfone) may further contain recurring monomer units made from a phenolic compound having more than two hydroxyl groups or a dihydroxy compound other than a biphenyl-containing compound.

The poly(biphenyl ether sulfone) may further contain terminal groups derived from mono-hydroxy phenols and/or aliphatic halides. It is preferable that the poly(biphenyl ether sulfone) has a reduced amount of hydroxyl termination because terminal hydroxyl groups may undergo oxidation during melt processing and thereby impart undesirable color to the poly(biphenyl ether sulfone). Preferably, the amount of hydroxyl end groups is less than 10 µm eq/g, more preferably less than 5 µm eq/g, and most preferably less than or equal to 2 µm eq/g.

Preferably the poly(biphenyl ether sulfone) contains only recurring monomer units derived from 4,4'-dihydroxybiphenyl and 4,4'-dichlorodiphenyl sulfone, and a terminal group that has only one or preferably no hydroxyl groups. The poly(biphenyl ether sulfone) of the invention may therefore consist of at least one type of terminal group (e.g., a monohydroxy phenol group and/or an aliphatic hydrocarbon) and repeating units that include only a diphenyl sulfone group and a biphenyl diphenol group.

Because it is not possible to obtain diphenyl sulfone or biphenol (or any derivatives or precursors of the aforementioned groups such as dichlorodiphenyl sulfone or any of the starting materials for the poly(aryl ether sulfones) mentioned herein) in a form that is 100% pure and free from any contaminant, the term "consisting of", as it is used herein, does not exclude other biphenols, sulfones or other polymerizable/condensable monomer groups to the extent that such groups are present in the starting materials used to make the poly(biphenyl ether sulfone) polymers and/or poly(biphenyl ether sulfone) copolymers of the invention. For example, a poly(biphenyl ether sulfone) of the invention that consists of repeating units made from biphenyl-containing group and a diphenyl sulfone may include other groups in amounts that are preferably no more than 5%, preferably 4%, more preferably 3%, more preferably 2% and most preferably 1% by weight based on the weight of the poly(biphenyl ether sulfone), when such groups enter the poly(biphenyl ether sulfone) adventitiously and/or as contaminants of the starting materials.

The weight average molecular weight of the poly(biphenyl ether sulfone) of the invention may be in any range that provides for practical processing, e.g., injection molding, extrusion, sheet forming, etc., under melt or thermoforming conditions to provide molded, formed and/or extruded articles having desirable physical and mechanical properties as well as good optical properties. The weight average molecular weight of the poly(aryl ether sulfone)s of the invention may range from about 10,000 to about 100,000, preferably about 40,000 to about 90,000, more preferably 50,000 to 80,000, more preferably 60,000 to 75,000, as measured by gel permeation chromatography using methylene chloride as a solvent and polystyrene calibration standards according to ASTM D-5296-05. The melt flow rate of the poly(biphenyl ether sulfone) of the invention is desirably low. For example, a melt flow rate of from 2-40 g/10 min is preferred, more preferably from 6-35 g/10 min, more preferably from 8-30 g/10 min, more preferably from 10-25 g/10 min, and most preferably from 14-28 g/10 min. Melt flow rate is reported as measured under the conditions of ASTM D 1238 at a temperature of 365° C. and a load of 5 kg. Melt flow rates of greater than 15 g/10 min may also be used.

The glass transition temperature for the poly(biphenyl ether sulfone) of the invention may range from about 180 to about 270° C., preferably 190-240° C., more preferably 200-230° C., more preferably 205-225° C., more preferably 210-220° C.

The poly(biphenyl ether sulfone)s of the invention may be made by reacting mixtures of compounds that contain a sulfone group (e.g., a diphenyl sulfone unit) and at least one biphenyl-containing group in a condensation reaction. For example, the poly(biphenyl ether sulfone) may be made by first reacting a dihalodiaryl sulfone (e.g., 4,4'-dichlorodiphenylsulfone) and a biphenyl diphenol (e.g., 4,4'-biphenol) to form a precursor mixture containing discreet (e.g., not fully polymerized) units that consist of one diphenyl sulfone group and one biphenyl group, and/or oligomers thereof. The precursor mixture may then be further reacted form the poly(biphenyl ether sulfone).

The biphenyl-containing group may include biphenyl-containing compounds other than biphenol and includes 4,4'-bis-(4-chlorophenyl sulfonyl)biphenyl (CSB).

The poly(biphenyl ether sulfone) of the invention may be formed by reacting a compound having two hydroxyl groups (e.g., biphenyl diphenol), optionally in the form of alkali or alkaline earth metal salts, with for example a dihalogenated diphenylsulfone such as 4,4'-dichlorodiphenyl sulfone. For example, the reaction may be carried out by reacting a metal salt of a biphenyl diphenol with dichlorodiphenylsulfone to thereby eliminate a metal halide which may be insoluble in the reaction medium. Precipitation of the resulting metal salt by-product from the reaction solution is one way to drive the reaction to completion. By carrying out the reaction of the alkali or alkaline earth salt of the biphenyl diphenol with the dihalodiphenylsulfone in a non-protic solvent, displacement of the halogen substituents of the dihalodiphenylsulfone leads to the formation of a new C—O bond.

The reaction of the metal salt of biphenyl diphenol with a dihalodiphenylsulfone to form at least a portion of the poly(biphenyl ether sulfone) of the invention is preferably carried out in a non-protic solvent. Because the solubility of the resulting alkali or alkaline earth metal halide side-product is very low in such solvents, it is easy to separate the poly(biphenyl ether sulfone) from the side product of the salt elimination reaction (e.g., the metal halide salt) after the reaction is complete. Preferably the reaction is carried out in a solvent such as a sulfoxide or sulfone solvent. The solvent may effectively dissolve both the reactants, e.g., the alkaline earth or alkali metal salts of the biphenyl diphenol, and the resulting polymer.

The non-protic (e.g., aprotic) solvent is preferably a substantially anhydrous dipolar aprotic solvent such as, e.g., dimethylsulfone, diphenylsulfone, dimethylacetamide, N-methylpyrrolidinone (NMP), tetrahydrothiophene-1,1-dioxide (sulfolane), tetrahydrothiophene-1-monoxide and mixtures thereof.

The reaction of the alkali or alkaline earth metal salt of the biphenyl diphenol with the dihalodiphenylsulfone is usually carried out at a temperature of from 190-250° C., preferably from about 200 to about 230° C., still more preferably about 210 to about 220° C. The reaction may be carried out for a period of from 0.5 to 3 hours.

Advantageously, the reaction is carried out under an inert atmosphere, such as nitrogen gas, argon gas or another gas that does not react with any of the starting materials, intermediates or products of the reaction.

The use of polar aprotic solvent provides another benefit. Any water formed during the reaction may form an azeotrope with a solvent. The water may later be removed as its azeotrope by distillation. In one embodiment of the invention, the distillation is carried out continuously during the polymerization reaction. When a further solvent such as an aromatic hydrocarbon, e.g., toluene, mono-chlorobenzene, xylene, and/or ethylbenzene, is present, a distillable azeotrope of the further solvent and water may be formed. As the reaction progresses under heating, the azeotrope may be continuously removed and thereby maintains an anhydrous condition during the reaction. Azeotropes of materials such as, e.g., toluene, xylene, ethylbenzene, and chlorobenzene, may be removed by distillation as the reaction proceeds.

In another embodiment the poly(biphenyl ether sulfone)s of the invention may be formed by carrying out a one-step process wherein an alkaline earth or alkali metal salt of a biphenyl diphenol or other biphenyl-containing group is reacted with a dihalodiphenylsulfone in a dipolar aprotic solvent and the resulting mixture is concurrently or subsequently polymerized without isolation of any intermediate. In a corresponding two-step process, the biphenyl diphenols are first converted to an alkaline earth metal salt or alkali metal salt by reaction of the biphenyl diphenols with an alkaline metal or alkaline earth metal compound. The resulting solution of the metal salts of the biphenyl diphenols is then mixed with a solution of the dihalodiphenylsulfone, or optionally the pure dihalodiphenylsulfone, incrementally or all at once.

In another embodiment the poly(biphenyl ether sulfone) is formed in a reaction that uses a molar excess of an alkali metal carbonate which is reacted with a biphenyl diphenol and a dihalodiphenylsulfone. The reaction may be carried out with, for example, a 25 mol % excess of the alkali metal carbonate, preferably 15 mol %, more preferably 10 mol %, even more preferably 5 mol % excess. The biphenyl diphenol reacts in situ with the alkali metal carbonate to form an alkali metal salt and the resulting alkali metal salt reacts with the dihalodiarysulfone.

The use of an alkali metal carbonate having an average particle size of less than about 100 μm is particularly preferred. The use of an alkali metal carbonate having such a particle size permits the synthesis of the polysulfone to be carried out at a relatively lower reaction temperature with faster reaction. Similar methods of preparing generic polysulfones are disclosed in U.S. Pat. No. 6,593,445, incorporated herein by reference in its entirety. Sodium and potassium carbonate salts, singly or in combination, may be used to provide a polysulfone having desirable molecular weight characteristics. Higher molecular weight poly(biphenyl ether sulfone)s may be obtained when a potassium salt is used.

After the reaction of the biphenyl diphenol metal salts with the dihalodiphenylsulfone is complete, the resulting polysulfone may be end-capped with one or more compounds such as a mono-phenol mentioned above. Preferably, the end capping includes reaction of the poly(biphenyl ether sulfone) intermediate with a reactive aromatic halide, or an aliphatic halide such as, e.g., methyl chloride. The end groups thus formed may include alkoxides or other ether groups.

To stop the reaction, e.g., the reaction of the biphenyl diphenol metal salt with the dihalodiphenylsulfone, methyl chloride may be sparged into the reaction mixture to thereby form a terminal methoxide group on the polysulfone.

The resulting poly(biphenyl ether sulfone) may be isolated by devolatilization of the reaction mixture after separation of salts with or without first adding additional solvent such as sulfolane or a mixture of sulfolane with another solvent, optionally the azeotrope solvent, to fully dissolve any poly (biphenyl ether sulfone) and cause the precipitation of the metal halide. Alternatively, the poly(biphenyl ether sulfone) may be isolated by precipitation and/or coagulation by contacting the reaction mixture with a non-solvent for the polymer such as an alcohol or water, or mixtures thereof. The precipitate/coagulate may be rinsed and/or washed with demineralized water prior to drying under reduced pressure and elevated temperature. The resulting precipitate may be further processed by extruding and pelletizing. The pelletized product may subsequently be subjected to further melt processing such as injection molding and/or sheet extrusion.

The poly(biphenyl ether sulfone) may be produced by any suitable method such as any of the methods described in U.S. Pat. Nos. 3,634,355; 4,008,203; 4,108,837; and 4,175,175; each of which is incorporated herein by reference in its entirety.

The Microparticles

The microparticles of the invention include glass and ceramic microparticles, microspheres, and microbubbles. Hollow microparticles are commercially available under trade names such as SCOTCHLITE™, Z-LIGHT SPHERES™, and ZEEOSPHERES™ from 3-M Specialty Materials.

Hollow microparticles include both glass microbubbles and ceramic microspheres. Ceramic microparticles (e.g., ceramic microspheres) are typically made from inorganic materials such as alumina instead of or in addition to borosilicate glass. Preferably the microparticles are hollow glass microspheres, i.e., hollow glass microbubbles. An advantage of glass microparticles that are in the form of spheres is their resistance to breakage. This property preserves the particle size distribution of the microspheres during processing and in finished (e.g., molded) parts.

Microparticles may be characterized by their particle size distribution. The particle size of the microparticles may be represented by the method of measuring particle size distribution disclosed in U.S. Published Patent Application No. 2006/0122049, incorporated herein by reference in its entirety. For example, the size of the microparticles may be described as an effective top size, i.e., the particle diameter in microns encompassing 95% by volume of the microparticles. The effective top size of the microparticles of the invention may be from 5 to 500 μm, preferably from 10 to 400 μm, 20 to 300 μm, 50 to 150 μm, and most preferably from 75 to 125 μm. In embodiments, the effective top size may be 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, and 200 μm, with all values and subranges between the stated values expressly included.

The particle size of the microparticles which encompasses 10% by volume of the hollow microspheres may range from 1 to 100 μm, preferably from 5 to 90 μm, more preferably from 10 to 80 μm, 25 to 70 μm, 30 to 60 μm, 40 to 50 μm. The particle size in microns that encompasses 50% by volume of the microparticles may range from 5 to 200 μm, preferably 10 to 180 μm, 20 to 160 μm, 30 to 150 μm, 40 to 130 μm, 50 to 120 μm, 60 to 110 μm, 70 to 100 μm, and 80 to 90 μm, with all values and subranges between and including the stated values expressly included herein. The particle size that encompasses 90% by volume of the microparticles may range from 10 to 200 μm, preferably 20 to 190 μm, 30 to 180 μm, 40 to 160 μm, 50 to 150 μm, 60 to 140 μm, 70 to 130 μm, 80 to 120 μm, 90 to 110 μm, and preferably about 100 μm.

The hollow glass microparticles may have a crush strength (ASTM D 3102-72) of from 100 to 50,000 psi, preferably from 200 to 20,000 psi, 250 to 20,000 psi, 300 to 18,000 psi, 400 to 14,000 psi, 500 to 12,000 psi, 600 to 10,000 psi, 700 to 8,000 psi, 800 to 6,000 psi, 1,000 to 5,000 psi, 1,400 to 4,000 psi, 2,000 to 4,000 psi, 2,500 to 3,500 psi and about 3,000 psi.

The density (ASTM D 2840-69) of the microparticles may be from 0.05 to 2 $g/cm^3$, 0.1-1.75 $g/cm^3$, 0.125-1.7 $g/cm^3$, 0.15-1.6 $g/cm^3$, 0.2-1.5 $g/cm^3$, 0.3-1.4 $g/cm^3$, 0.4-1.3 $g/cm^3$, 0.5-1.2 g/cm$^3$, 0.6-1.1 g/cm$^3$, 0.7-1.0 g/cm$^3$, 0.8-0.9 g/cm$^3$, and about 0.85 g/cm$^3$. The glass microbubbles preferably have a low density such as from 0.1 to 1.5 g/cm$^3$, 0.125-1.4 g/cm$^3$, 0.15-1.3 g/cm$^3$, 0.2-1.2 g/cm$^3$, 0.3-1.1 g/cm$^3$, 0.4-1.0 g/cm$^3$, 0.5-0.6 g/cm$^3$, and about 0.65 g/cm$^3$.

The hollow glass microspheres may have a wall thickness of from 0.1 to 5 μm, preferably from 2-4 μm, 0.3-3 μm, 0.4-2 μm, 0.5-1.0 μm, 0.6-0.9 μm, 0.7-0.9 μm, and about 0.8 μm.

The space occupied by the glass and the core of the particle, respectively in volume percent, may range from 1-50 volume %, 5-40%, 10-35%, 15-30%, 20-25%, and about 20 volume %. The volume of the hollow microparticle represented by encapsulated gas may be from 99.9 to 50% by vol., 99-51% by vol., 95-45% by vol., 90-60% by vol., 85-65% by vol., 80-70% by vol., and about 75% by vol. and volume % are based on the volume defined by the outside surface of the microparticle.

The internal radius of the hollow microspheres may be from about 1 μm to about 50 μm, preferable ranges of radii include 5-45 μm, 10-40 μm, 15-35 μm, 20-30 μm, and about 25 μm.

The glass microparticles, microspheres, and/or microbubbles may be made of glass materials including soda lime borosilicate glass, lead glass, borosilicate glass, aluminosilicate glass, quartz glass and fused silica glass. The glass of the hollow microspheres is preferably a soda lime borosilicate glass containing from 70 to 80 wt. % of SiO$_2$, from 3 to 8 wt. % of Na$_2$O, from 8 to 15 wt. % of CaO, and from 2 to 6% by weight of B$_2$O$_3$ based on the total weight of the glass. The softening point of the soda lime borosilicate glass is preferably from 550-750° C., more preferably 575-750° C., most preferably about 600° C.

The hollow glass microspheres may be microspheres from which loose particulate silica has been washed. Alternately, the hollow glass microspheres may contain one or more types of a precipitated or fumed particulate silica that may act as a flow agent or an agent to modify the chemical and/or physical properties of the glass microspheres.

The glass and/or ceramic microparticles, microspheres and/or microbubbles may have an exterior surface that is chemically modified by treatment with, for example, a sizing agent or other chemical compound which may react with hydroxyl groups present on the surface of the glass. Preferably the sizing agent used to treat the exterior surface of the glass microspheres is a silane or an epoxy, preferably the silane is an organosilane having at one end-group that may react with hydroxyl groups present on the exterior surface of the glass microspheres and on the other end, an organic or polymeric group that may have polar or non-polar characteristics. The glass may be a floated glass made by suspending glass on a molten metal such as tin to provide glass microspheres having superior surface uniformity.

Glass microbubbles may be made according to the procedure described in U.S. Published Patent Application No. 2006/0122049, incorporated herein by reference in its entirety.

Ceramic microspheres including hollow microparticles may be used instead of or in addition to glass microspheres and/or glass microbubbles. Ceramic microspheres may be made from materials such as TiO$_2$, aluminosilicate, alkali aluminosilicate, silica alumina, alumina, zirconia, oxide ceramics, non-oxide ceramics such as carbides, borides, nitrides and silicides, boron carbide, boron nitride, ferrite, lead zirconate titanate, magnesium diboride, silicon carbide, silicon nitride, uranium oxide, zinc oxide, zirconium dioxide, magnesium oxide, mullite, tungsten carbide and mixtures thereof. Preferred ceramic microspheres include ZEEOSPHERES™ from 3-M Specialty Materials.

The ceramic microspheres may be hollow or solid. The hollow ceramic microspheres may have a density (ASTM D 2840-69) of from 0.1 to 2.0 g/cm$^3$, preferably 0.2-1.8 g/cm$^3$, 0.3-1.6 g/cm$^3$, 0.4-1.4 g/cm$^3$, 0.5-1.2 g/cm$^3$, 0.6-1.0 g/cm$^3$, 0.7-0.9 g/cm$^3$, about 0.8 g/cm$^3$. The crush strength (ASTM D 3102-72) of hollow ceramic microspheres may be from 100 to 60,000 psi, preferably from 120 to 50,000 psi, 200 to 20,000 psi, 250 to 20,000 psi, 300 to 18,000 psi, 400 to 14,000 psi, 500 to 12,000 psi, 600 to 10,000 psi, 700 to 8,000 psi, 800 to 6,000 psi, 1,000 to 5,000 psi, 1,400 to 4,000 psi, 2,000 to 4,000 psi, 2,500 to 3,500 psi and about 3,000 psi. The crush strength of ceramic microspheres may be 60,000 psi or greater.

Solid ceramic microspheres have a density (ASTM D 2840-69) that is higher than hollow ceramic microspheres. For example, densities in the ranges of from 1.0 to 3.0 g/cm$^3$, preferably 1.1-2.9 g/cm$^3$, 1.2-2.8 g/cm$^3$, 1.3-2.7 g/cm$^3$, 1.4-2.6 g/cm$^3$, 1.5-2.5 g/cm$^3$, 1.6-2.4 g/cm$^3$, 1.7-2.3 g/cm$^3$, 1.8-2.2 g/cm$^3$, and 1.9-2.0 g/cm$^3$ may be used.

The particle size of the solid and hollow ceramic microspheres that may be used in the invention may be represented by a method of measuring particle size distribution as disclosed in U.S. Published Patent Application No. 2006/0122049, incorporated herein by reference in its entirety. For example, the size of the microparticles may be described as the effective top size, i.e., the particle diameter in microns encompassing 95% by volume of the microparticles. The effective top size of the microparticles of the invention may be from 1 to 500 μm, preferably from 5 to 400 μm, more preferably from 10 to 300 μm, 20 to 150 μm, most preferably from 30 to 100 μm. In embodiments the effective top size may be 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, and 200 μm, with all values and subranges between the stated values expressly included.

The particle size of the solid ceramic microparticles which encompasses 10% by volume of the microparticles may range from 1 to 100 μm, preferably from 5 to 90 μm, 10 to 80 μm, 25 to 70 μm, 30 to 60 μm, 40 to 50 μm. The particle size in microns that encompasses 50% by volume of the microparticles may range from 5 to 200 μm, preferably 10 to 180 μm, 20 to 160 μm, 30 to 150 μm, 40 to 130 μm, 50 to 120 μm, 60 to 110 μm, 70 to 100 μm, and 80 to 90 μm, with all values and subranges between and including the stated values expressly included herein.

The particle size that encompasses 90% by volume of the microparticles may range from 10 to 200 μm, preferably 20 to 190 μm, 30 to 180 μm, 40 to 160 μm, 50 to 150 μm, 60 to 140 μm, 70 to 130 μm, 80 to 120 μm, 90 to 110 μm, and preferably about 100 μm.

Second Aspect of the Invention

Another aspect of the invention includes a composition comprising a mixture of high crush strength hollow glass microspheres and one or more poly(aryl ether sulfone)s.

The Poly(Aryl Ether Sulfone)

For the purpose of the invention, a poly(aryl ether sulfone) is intended to denote any polymer of which at least 5 wt. % of the recurring units are recurring units (R) of one or more formulae comprising at least one arylene group, at least one ether group and at least one sulfone group [—S(=O)$_2$—].

The sulfone group is usually in-between two phenylene groups as in the formula below:

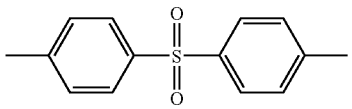

The poly(aryl ether sulfone) is usually obtainable by a polycondensation reaction. Preferably, it is effectively obtained by such a reaction; the case being, it may be notably synthesized by polycondensing at least one dihalodiphenyl sulfone with at least one diol.

The poly(aryl ether sulfone) is usually amorphous, and it has usually a glass transition temperature. Preferably, the poly(aryl ether sulfone) has a glass transition temperature of at least 150° C., preferably at least 160° C., and more preferably at least 175° C.

The glass transition temperature of the poly(aryl ether sulfone) can be measured by any suitable technique known from the skilled in the art; very often, they are measured by Differential Scanning Calorimetry. For example, a Universal V3.7A Instruments DSC calorimeter can be used to measure the glass transition temperature of the poly(aryl ether sulfone). For this purpose, it is preliminarily checked that the calorimeter was well-calibrated by means of a calibration sample. Then, the poly(aryl ether sulfone) is submitted to the following heating/cooling cycle: $1^{st}$ heating from room temperature up to 350° C. at a rate of 10° C./min, followed by cooling from 350° C. down to room temperature at a rate of 20° C./min, followed by $2^{nd}$ heating from room temperature up to 350° C. at a rate of 10° C./min. The glass transition temperature is measured during $2^{nd}$ heating. The glass transition temperature is advantageously determined by a construction procedure on the heat flow curve: a first tangent line to the curve above the transition region is constructed; a second tangent line to the curve below the transition region is also constructed; the temperature on the curve halfway between the two tangent lines, or ½ delta Cp, is the glass transition temperature.

The poly(aryl ether sulfone) comprises preferably above 25 wt. %, more preferably above 50 wt. %, still more preferably above 90 wt. %, and even more preferably above 95 wt. % of recurring units (R). Most preferably, the poly(aryl ether sulfone) contains recurring units (R) as sole recurring units.

Embodiment (E1)

In a certain embodiment (E1) of the present invention, the poly(aryl ether sulfone) is the poly(biphenyl ether sulfone) as described herein.

Embodiment (E2)

In a certain embodiment (E2) of the present invention, the poly(aryl ether sulfone) is a polysulfone.

To the purpose of the present invention, a polysulfone is intended to denote any polymer of which more than 50 wt. % of the recurring units are recurring units (R2) of one or more formulae containing at least one ether group (—O—), at least one sulfone group (—SO$_2$—) and at least one group as shown hereafter:

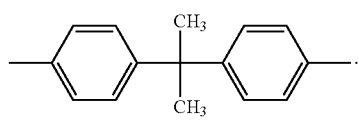

Preferably, recurring units (R2) are chosen from

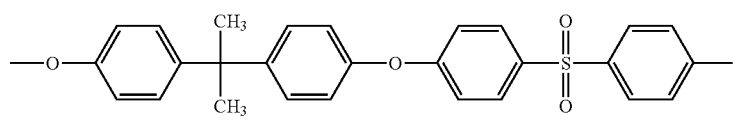
(9)

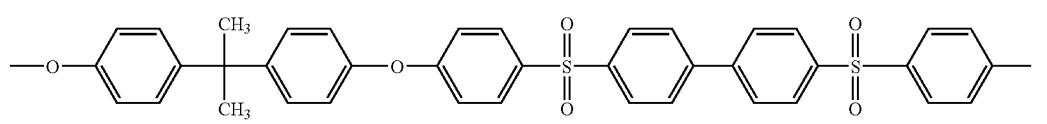
(10)

and mixtures thereof.

Very preferably, recurring units (R2) are

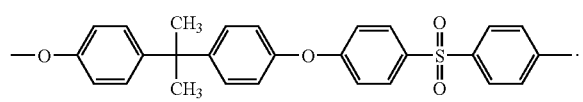
(9)

The polysulfone may notably be a homopolymer, a copolymer such as a random or block copolymer. When the polysulfone is a copolymer, its recurring units may notably be composed of (i) recurring units (R2) of formulas (9) and (10), or (ii) on one hand, recurring units (R2) of at least one of formulas (9) and (10), and, on the other hand, recurring units (R2*), different from recurring units (R2), such as:

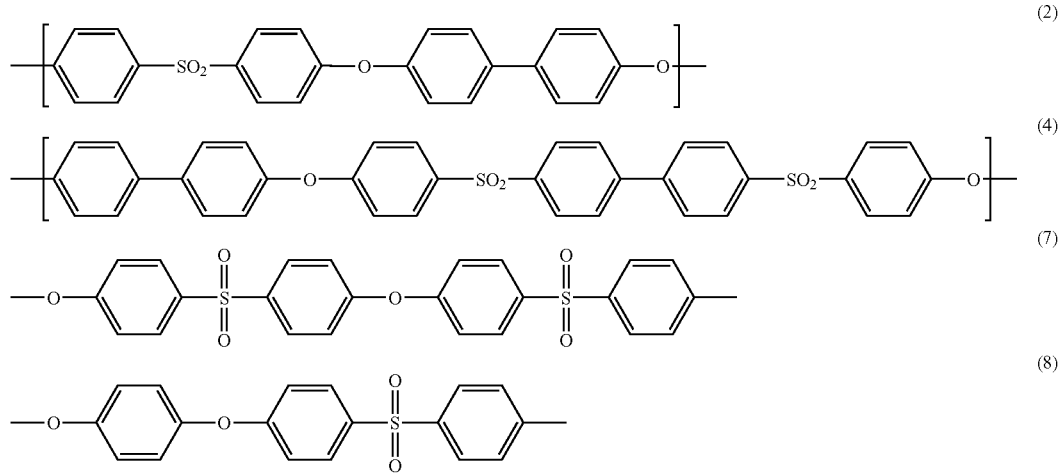

and mixtures thereof.

Preferably more than 90 wt. %, and more preferably more than 95 wt. % of the recurring units of the polysulfone are recurring units (R2). Still more preferably, all the recurring units of the polysulfone are recurring units (R2).

The most preferred polysulfone is a homopolymer of which the recurring units are recurring units (R2) of formula (9)

Such a polysulfone homopolymer is notably commercialized by SOLVAY ADVANCED POLYMERS, L.L.C. under the trademark UDEL®.

Embodiment (E3)

In a certain embodiment (E3) of the present invention, the poly(aryl ether sulfone) is a polyethersulfone.

To the purpose of the present invention, a polyethersulfone is intended to denote any polymer of which more than 50 wt. % of the recurring units are recurring units (R3) of formula (7)

The polyethersulfone may be notably a homopolymer, or a copolymer such as a random or a block copolymer. When the polyethersulfone is a copolymer, its recurring units are advantageously a mix of recurring units (R3) of formula (7) and of recurring units (R3*), different from recurring units (R3), such as:

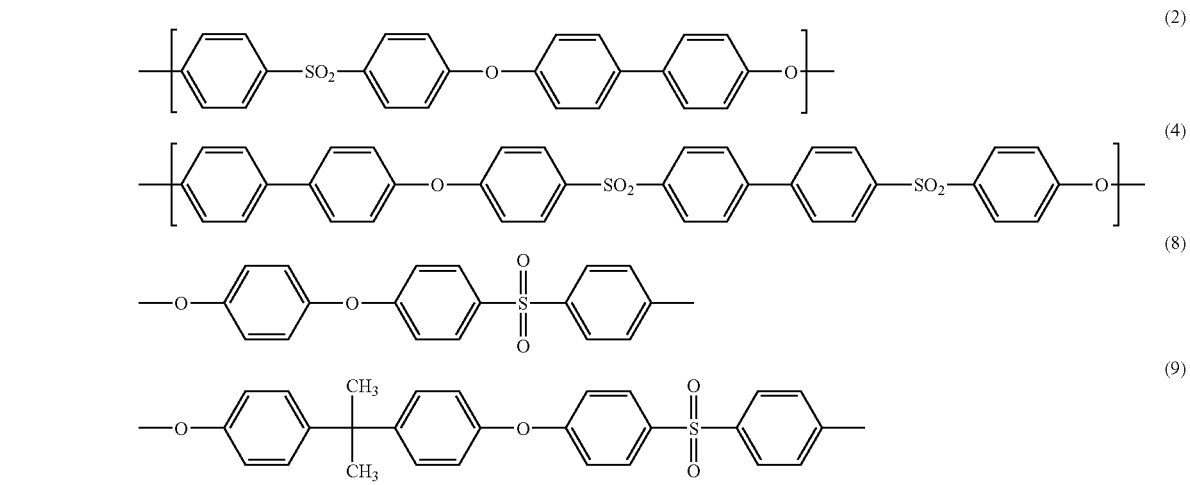

and mixtures thereof.

Preferably, the polyethersulfone is a homopolymer, or it is a copolymer the recurring units of which are a mix composed of recurring units (R3) of formula (7) and of recurring units (R3*) of formula (8), or it can also be a mix of the previously cited homopolymer and copolymer.

SOLVAY ADVANCED POLYMERS, L.L.C. commercializes various polyethersulfones under the trademark RADEL® A.

Embodiment (E4)

In a certain embodiment (E4) of the present invention, the poly(aryl ether sulfone) is a polyimidoethersulfone.

For the purpose of the present invention, a polyimidoethersulfone is intended to denote a polymer of which at least 5 wt. % of the recurring units are recurring units (R4) of formula (11a), (11b) and/or (11c), as represented below:

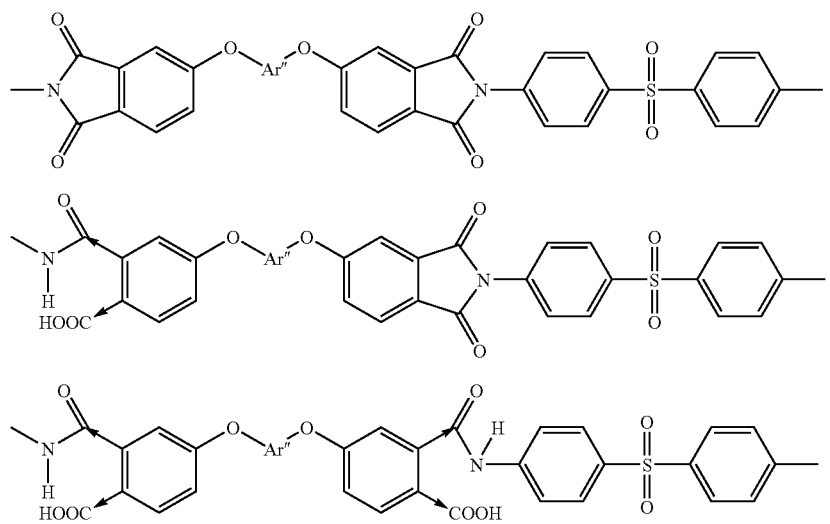

wherein:
(11b) and (11c) are the amic acid forms corresponding to the imide form (11a); the → denotes isomerism so that in any recurring unit the groups to which the arrows point may exist as shown or in an interchanged position;

Ar" is chosen among the following structures:

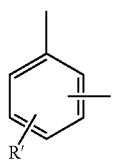

with the linking groups being in ortho, meta or para position and R' being a hydrogen atom or an alkyl radical comprising from 1 to 6 carbon atoms,

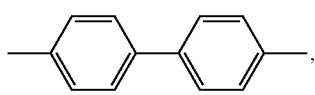

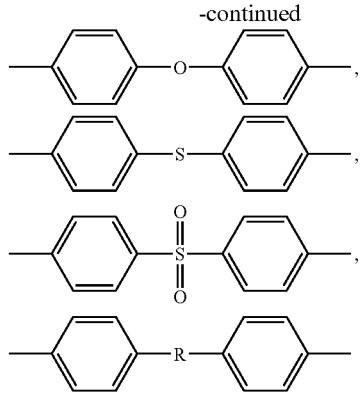

with R being an aliphatic divalent group of up to 6 carbon atoms, such as methylene, ethylene, isopropylene and the like, and mixtures thereof.

Preferably more than 50 wt. %, and more preferably more than 90 wt. % of the recurring units of the polyimidoethersulfone are recurring units (R4). Still more preferably, all the recurring units of the polyimidoethersulfone are recurring units (R4).

The High Crush Strength Hollow Glass Microspheres

In this aspect of the invention the high crush strength hollow glass microspheres must have a crush strength of at least 15,000 psi. Preferably the crush strength of the high crush strength hollow glass microspheres is 18,000 psi or greater, more preferably, 20,000 psi or greater, most preferably 30,000 psi or greater. The high crush strength hollow glass microspheres preferably have a crush strength (ASTM D 3102-72) of about 28,000 psi. Preferably the high strength hollow glass microparticles are iM30K glass microparticles available from 3M Specialty Materials Co.

The high strength hollow glass microparticles preferably have an average diameter of 5-50 μm, preferably 10-40 μm, 15-30 μm, 20-25 μm, most preferably about 18 μm.

The density (ASTM D 2840-69) of the high strength hollow glass microparticle is preferably from 0.2-1.5 g/cm$^3$, more preferably 0.3-1.4 g/cm$^3$, 0.4-1.3 g/cm$^3$, 0.5-1.2 g/cm$^3$, 0.60-1.1 g/cm$^3$, 0.7-1.0 g/cm$^3$, 0.8-0.9 g/cm$^3$ and about 0.65 g/cm$^3$.

In the embodiment of the invention that includes the high strength hollow glass microspheres, at least 15 wt. % of the recurring units of the poly(aryl ether sulfone), based on the total weight of the poly(aryl ether sulfone), are aryl ether sulfone units, and may include a polysulfone and/or a poly (biphenylether sulfone). Most preferably the poly(aryl ether sulfone) of the high strength hollow glass microspheres-containing composition is the poly(biphenyl ether sulfone) described herein. Alternately, or in addition to the poly(aryl ether sulfone), the composition may include a polyether imide, a polycarbonate, polyetheretherketone (PEEK), polyphenylenesulfide (PPS), liquid crystal polymer (LCP), self-reinforcing polymer (SRP, which is commonly used to denote certain polyphenylenes), tetrafluoroethylene (TFE)/perfluoromethylvinylether (PFMVE) copolymer (MFA), tetrafluoroethylene (TFE)/perfluoro-propylvinylether (PFPVE) copolymer (PFA), fluorinated ethylene propylene (FEP, which is commonly used to denote certain tetrafluoroethylene/hexafluoroethylene copolymers) and blends thereof, preferably a poly(biphenyl ether sulfone)/PEEK blend.

The compositions of the first and second aspects of the invention may be in a solid or a liquid form. In the solid form the compositions of the invention may be a homogenous pulverulent mixture of the powdered poly(biphenyl ether sulfone), a poly(aryl ether sulfone) and/or a polysulfone and the microparticles, optionally with other pulverulent components. In addition to the poly(aryl ether sulfone) and the hollow microparticles, the pulverulent composition may contain one or more additives and/or additional fillers also homogeneously dispersed throughout the composition. The additional additives may be in the form of a pulverulent solid or alternatively may be added to the pulverulent composition in the form of a liquid and/or a gas that is adsorbed by the powdered components.

In the liquid form, the poly(biphenyl ether sulfone) is intimately mixed with the hollow microparticles to provide a homogeneous liquid or highly viscous liquid composition. Because the poly(aryl ether sulfone) must be present in the form of a liquid and/or highly viscous material, in order to be in the liquid form, the composition must be heated to a temperature that is at least as great as the glass transition temperature of the poly(aryl ether sulfone).

Alternately, the composition may be in the form of a solution containing a poly(aryl ether sulfone) dissolved in a solvent or matrix liquid within which the glass microspheres are dispersed and/or suspended.

The compositions may be in the form of bulk solid materials within which the microparticles are suspended, dispersed and held in place in a matrix of solidified poly(aryl ether sulfone). Preferably, the microparticles are completely encapsulated within a poly(aryl ether sulfone) matrix and are thereby immobilized. A small amount, generally less than 10% by weight, preferably less than 5%, most preferably less than 1% by weight based on the total weight of the microparticles, are present on the surface of the solid bulk composition and at least a portion of some of the microparticles have a surface extending outside the surface of the poly(aryl ether sulfone).

Third Aspect of the Invention

A third aspect of the invention includes compositions comprising one or more of (i) a polyetherimide and a polycarbonate, and (ii) hollow glass microspheres having a very high crush strength. The microparticles of the third aspect of the invention may be the same as the very high crush strength hollow glass microparticles of the second aspect of the invention.

The Polycarbonate

A polycarbonate resin is one which is obtained by condensing aromatic and/or aliphatic dihydroxy compounds with carbonate groups (—C=O—) to provide a resin having repeating or recurring units derived from the dihydroxy compound and the carbonate groups.

Preferred polycarbonate polymers and copolymers include polycarbonatesiloxane co-polymers such as Lexan® 9705. For example, the polysulfone/polysiloxane/polycarbonate block copolymers described in U.S. Pat. No. 6,566,458 incorporated herein by reference in its entirety. For example, a block copolymer comprising structural units of the formula (I-S):

wherein $R^1$ comprises polysulfone groups, and structural units of the formula (II-S):

wherein $R^2$ comprises polysiloxane groups.

Other copolymers include copolymers with polyarylates such as the polysulfone/polyarylate copolymers made from bis-phenol A, dichlorodiphenyl sulfone, resorcinol, and a 1:1 mixture if isophthalic and terephthalate acid described in U.S. Pat. No. 6,815,483 B2, incorporated herein be reference in its entirety. For example, prepared from a copolymer of a first polymer which is a poly(aryl ether sulfone), polysulfone, polyetherketone, or polyetherimide and a second condensation polymer having structural units containing an oxycarbonyl group, and a salt of a dihydroxyaromatic compound with at least one substituted aromatic compound of the formula

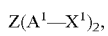

wherein Z is an activating radical, $A^1$ is an aromatic radical and $X^1$ is fluoro, chloro, bromo or nitro, in the presence of said second polymer.

Blends of polycarbonate polymers and/or copolymers with one or more other resins may also be used. For example, blends of polycarbonate and acrylonitrile butadiene styrene (ABS) resin may be used.

The Polyetherimide

For the purpose of the present invention, an aromatic polyetherimide is intended to denote any polymer of which more than 50 wt. % of the recurring units (R1) comprise at least one aromatic ring, at least one imide group, as such and/or in its amic acid form, and at least one ether group [recurring units (R1c)].

Recurring units (R1-c) may optionally further comprise at least one amide group which is not included in the amic acid form of an imide group.

A first class of aromatic polyetherimides consists of those wherein the recurring units (R1) are chosen from:

(R1c-1)

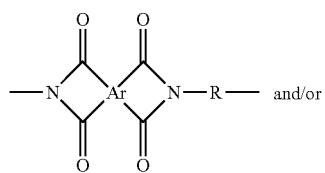 and/or

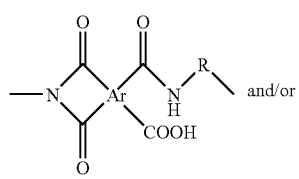 and/or

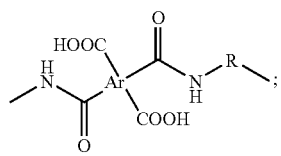

(R1c-2)

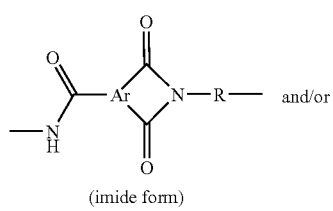

(imide form)

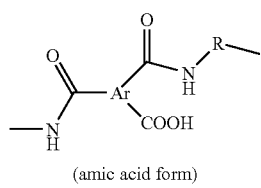

(amic acid form)

where:

Ar is:

formula (XVIII)

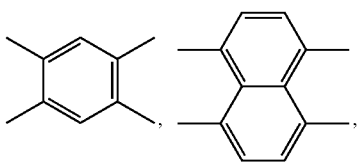

formula (XIX)

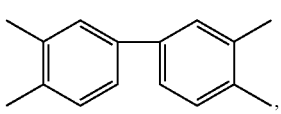

formula (XX)

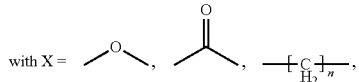

with $X = $ —O—, 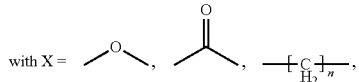

with n=1, 2, 3, 4 or 5;

R is:

(XXI)

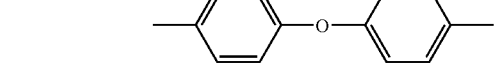

(XXII)

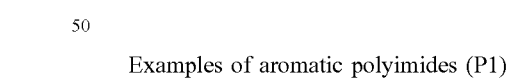

Examples of aromatic polyimides (P1) belonging to this first class of aromatic polyetherimides are those wherein the recurring units (R1) are of formula:

(XXIII)

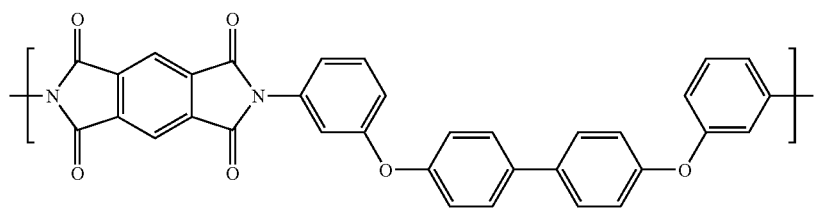

and/or its two corresponding amic acid forms [see formulae (XIX) and (XX) vs. the wholly imide form of formula (XVIII)].

Aromatic polyetherimides wherein essentially all, if not all, the recurring units are of formula (XOH), and/or their two corresponding amic acid forms, are notably commercially available from Mitsui as AURUM® polyimide.

A second class of aromatic polyetherimides is composed of those wherein the recurring units (R1) are recurring units (R1c-3) of formula

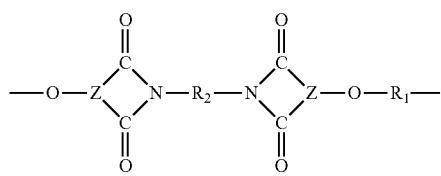
(XXIV)

wherein:
(i) —O—Z is a member selected from
  (i-a)

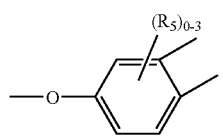
(XXV)

wherein $R_5$ is independently hydrogen, lower alkyl or lower alkoxy;
  (i-b)

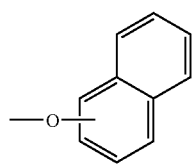
(XXVI)

wherein the oxygen may be attached to either ring and located ortho or para to one of the bonds of the imide carbonyl groups
and (i-c)

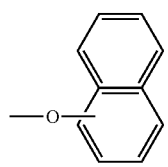
(XXVII)

wherein the oxygen may also be attached to either ring and located ortho or para to one of the bonds of the imide carbonyl groups (ii) $R_1$ is selected from
(ii-a) substituted or unsubstituted aromatic radicals such as

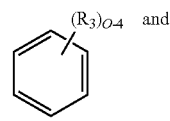
(XXVIII)

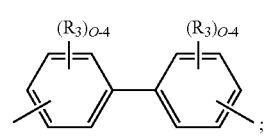
(XXIX)

(ii-b) divalent radicals of the formula:

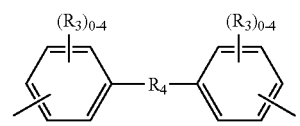
(XXX)

wherein $R_3$ is independently C1 to C6 alkyl, aryl or halogen and $R_4$ is selected from —O—, —S—, —SO$_2$—, —SO—, alkylenes of 1 to 6 carbon atoms, cycloalkylenes of 4 to 8 carbon atoms, alkylidenes of 1 to 6 carbon atoms or cycloalkylidenes of 4 to 8 carbon atoms;
(iii) $R_2$ is selected from aromatic hydrocarbon radicals having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and C2 to C8 alkylene terminated polydiorganosiloxanes or a divalent radical of the formula (XXX) wherein $R_3$ and $R_4$ are as previously defined.

The recurring units (R1c-3) may be contained in the aromatic polyetherimide (P1) as such and/or in their two amic acid forms.

These polyetherimides are prepared by methods well known in the art as set forth in, for example, U.S. Pat. Nos. 3,833,544, 3,887,588, 4,017,511, 3,965,125 and 4,024,110.

The aromatic polyetherimides wherein the recurring units (R1) are recurring units (R1c-3) may, for example, be prepared by effecting reaction in the presence of a dipolar aprotic solvent of a mixture of ingredients comprising, for instance, (1) a bis(nitrophthalimide) of the general formula:

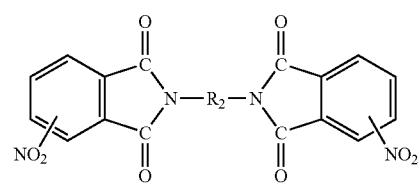
(XXXI)

wherein $R_2$ is defined as hereinabove, and (2) an alkali metal salt of an organic compound of the general formula:

MO—R$_1$—OM  (XXXII)

wherein M is an alkali metal and $R_1$ is defined as hereinabove.

The diamines are as described infra, when discussing the third class of aromatic polyetherimides.

The preferred nitrophthalic anhydrides useful in the present invention are 3-nitrophthalic anhydride, 4-nitrophthalic anhydride and mixtures thereof.

A third class of aromatic polyetherimides consists of those wherein the recurring units (R1) are recurring units (R1c-4)

(XXXIII)

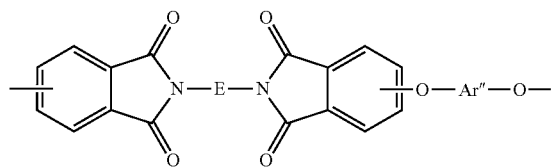

as such, and/or in their amic acid forms (XXXIV)

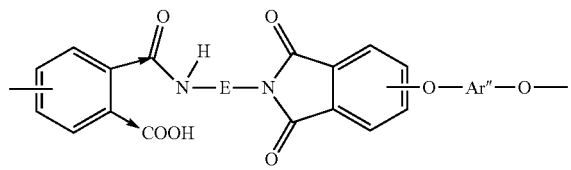

and/or (XXXV)

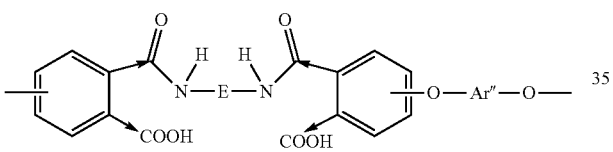

wherein:
- the → denotes isomerism so that in any recurring unit the groups to which the arrows point may exist as shown or in an interchanged position;

E is chosen from:

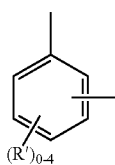

(E-i) with the R' being, independently from each other, alkyl radicals comprising from 1 to 6 carbon atoms, aryls or halogens;

(E-ii)

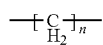

with n=integer from 1 to 6;

(E-iii)

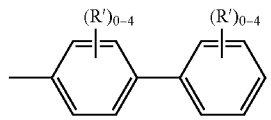

with the R' being, independently from each other, alkyl radicals comprising from 1 to 6 carbon atoms, aryls or halogens;

(E-iv)

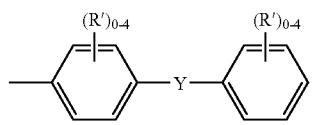

with the R' being, independently from each other, alkyl radicals comprising from 1 to 6 carbon atoms, aryls or halogens;
and Y being chosen from:

(Y-i) alkylenes of 1 to 6 carbon atoms, in particular

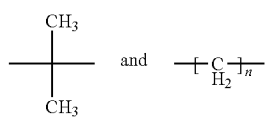

with n=integer from 1 to 6, (Y-ii) perfluoroalkylenes of 1 to 6 carbon atoms, in particular

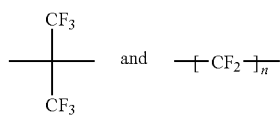

with n=integer from 1 to 6, (Y-iii) cycloalkylenes of 4 to 8 carbon atoms;
(Y-iv) alkylidenes of 1 to 6 carbon atoms;
(Y-v) cycloalkylidenes of 4 to 8 carbon atoms;
(Y-vi)

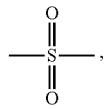

(Y-vii)

(Y-viii)

(Y-ix)

(Y-x)

Ar'' is selected from:
(Ar''-i) aromatic hydrocarbon radicals having from 6 to 20 carbon atoms and halogenated substituted thereof, or alkyl substituted derivatives thereof, wherein the alkyl substituting group contains 1 to 6 carbon atoms, such as:

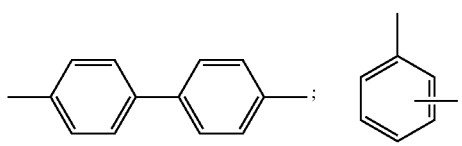

and halogenated substituted thereof, or alkyl substituted derivatives thereof, wherein the alkyl substituting group contains from 1 to 6 carbon atoms;
(Ar''-ii)

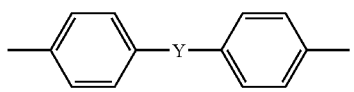

with Y being chosen from (Y-i), (Y-ii), (Y-iii), (Y-iv), (Y-v), (Y-yl), (Y-vii), (Y-viii), (Y-ix) and (Y-x), as above defined,
(Ar''-iii) alkylene and cycloalkylene radicals having from 2 to 20 carbon atoms, and
(Ar''-iv) terminated polydiorganosiloxanes.

The aromatic polyetherimides wherein the recurring units (R1) are recurring units (R1c-4) may be prepared by any of the methods well-known to those skilled in the art including the reaction of any aromatic bis(ether anhydride)s of the formula

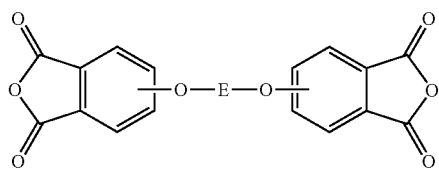

where E is as defined hereinbefore, with a diamino compound of the formula

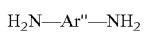 (XXXVII)

where Ar'' is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and diamines, at temperatures of from about 20° C. to about 250° C.

Alternatively, these polyetherimides can be prepared by melt polymerization of any dianhydrides of formula (XXXVI) with any diamino compound of formula (XXXVII) while heating the mixture of the ingredients at elevated temperatures with concurrent intermixing.

The aromatic bis(ether anhydride)s of formula (XXXVI) include, for example:
2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4 (3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy) diphenyl-2,2-propane dianhydride; etc. and mixtures of such dianhydrides.

The organic diamines of formula (XXXVII) include, for example, m-phenylenediamine, p-phenylenediamine, 2,2-bis (p-aminophenyl)propane, 4,4'-diaminodiphenyl-methane, 4,4'-diaminodiphenyl sulfide, 4,4'-diamino diphenyl sulfone, 4,4'-diaminodiphenyl ether, 1,5-diaminonaphthalene, 3,3'-dimethylbenzidine, 3,3'-dimethoxybenzidine, In the recurring units (R1c-4), E is preferably chosen from (E-i)

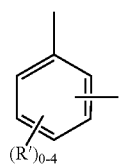

with the R' being, independently from each other, alkyl radicals comprising from 1 to 6 carbon atoms, aryls or halogens; more preferably, E is unsubstituted m-phenylene.

Besides, in the recurring units (R1c-4), Ar'' is preferably chosen from (Ar''-ii)

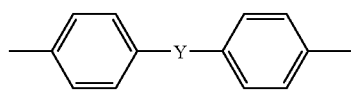

with Y being chosen from (Y-i), (Y-ii), (Y-iii), (Y-iv), (Y-v), (Y-yl), (Y-vii), (Y-viii), (Y-ix) and (Y-x), as above defined.

More preferably, Ar" is

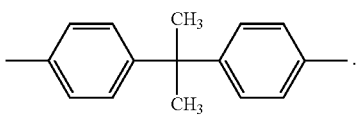

Good results are obtained when the recurring units (R1c-4) are recurring units of formula (XXXVIII) as such, in imide form, and/or in amic acid forms [formulae (XXXIX) and (XL)]:

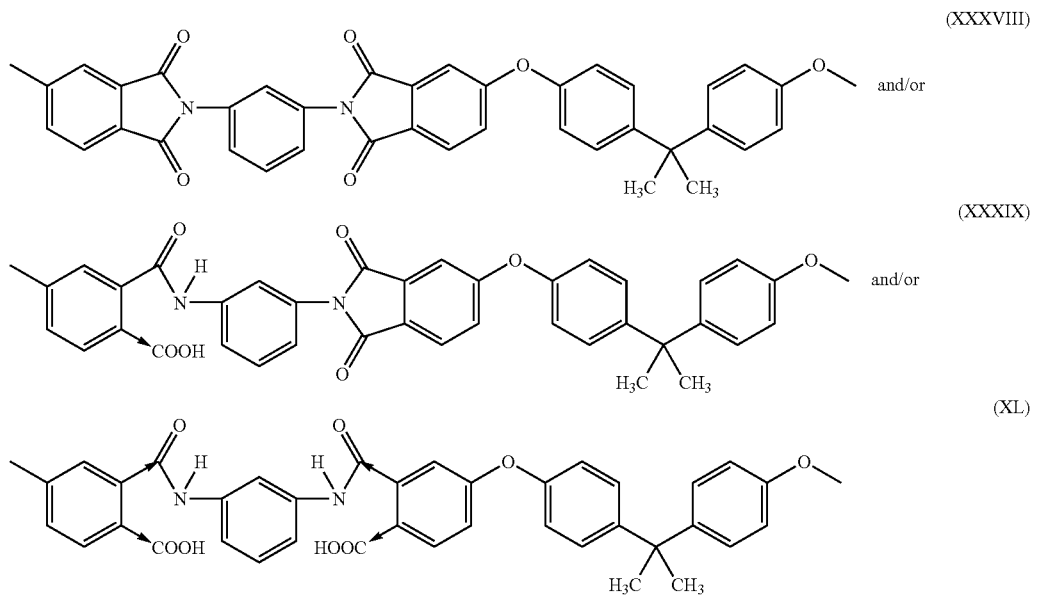

wherein in formulae (XXXIX) and (XL) the → denotes isomerism so that in any recurring unit the groups to which the arrows point may exist as shown or in an interchanged position.

Among all the aromatic polyetherimides, those belonging to this third and last class are generally preferred.

Preferably more than 75 wt. % and more preferably more than 90 wt. % of the recurring units of the aromatic polyimide (P1) are recurring units (R1). Still more preferably, essentially all, if not all, the recurring units of the aromatic polyimide (P1) are recurring units (R1).

Excellent results are obtained when the aromatic polyimide (P1) is chosen from aromatic polyetherimides of which essentially all, if not all, the recurring units are of formula (XXXVIII), and/or their corresponding amic acid forms (XXXIX) and/or (XL).

Such aromatic polyimides are notably commercially available form General Electric as ULTEM® polyetherimides.

The compositions can comprise one and only one aromatic polyimide (P1). Alternatively, they can comprise two, three, or even more than three aromatic polyimides (P1).

Preferred polyetherimides include the ULTEM 900 series materials including ULTEM 8015, 9075, 9076 and 9085 as well as reinforced materials including AR9100, AR9200, AR9300, and AR9110. Blends with polycarbonates are also preferred including Ultem ATX series materials including ATX100(R,F), ATX200(R,F), 1285 and DU242. Siloxanepolyetherimide copolymers and blends thereof with polycarbonate such as those described in U.S. Pat. No. 5,051,483, incorporated herein by reference in its entirety, are also preferred. For example, the polyetherimides used for preparing the blends may contain repeating groups of the formula (I-PEI)

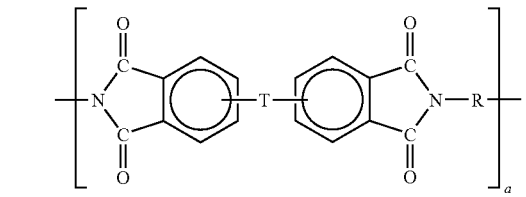

wherein "a" is an integer greater than 1, e.g., from 10 to 10,000 or more; T is —O— or a group of the formula

—O—Z—O— wherein the divalent bonds of the —O— or the —O—Z—O— group are in the 3,3'; 3,4'; 4,3', or the 4,4' positions; Z is a member of the class consisting of a methyl or halo, preferably bromo, substituted aryl or diary group and (B) divalent organic radicals having two aryl groups separated by a group "X" where X is a member selected from the group consisting of divalent radicals of the formulas

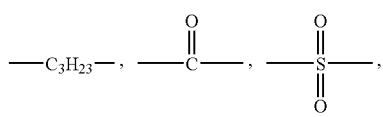

—O— and —S— where y is an integer from 1 to about 5; and R is a divalent organic radical selected from the group consisting of (a) aromatic hydrocarbon radicals having from 6 to about 20 carbon atoms and halogenated derivatives thereof, and (b) alkylene radicals having from 2 to about 20 carbon atoms, cycloalkylene radicals having from 3 to about 20 carbon atoms.

Blends of a poly(biphenyl ether sulfone) and one or more of a polyetherimide and a polycarbonate are especially preferred. The poly(biphenyl ether sulfone) may be the same as the poly(biphenyl ether sulfone) of the first aspect of the invention. One embodiment of the third aspect of the invention includes a blend of a poly(biphenyl ether sulfone) and from 5-50%, preferably 10-45%, 15-40%, 20-35%, 25-30% and about 25% by weight of one or more polyetherimides or polycarbonates where % by weight is based on the total weight of the composition.

In still a further embodiment, the composition comprises a blend of one or more of a polycarbonate and a polyetherimide and a polyetheretherketone (PEEK) resin. The PEEK resin may be present in an amount of from 30-60% by weight, preferably 35-55%, 40-50 and about 45% by weight based on the total weight of the composition.

Advantageous properties of the thermoplastic compositions of the invention include high flame resistance, high flame retardance, low total heat release, and a low peak heat release. The thermoplastic compositions of the invention preferably have both a total heat release (THR) and peak heat release (HRR) of less than 65 kW·min/m$^2$ and kW/m$^2$, respectively, under the conditions of the OSU flammability test. More preferably the thermoplastic compositions of the invention have a THR and a HRR of less than 60, even more preferably less than 55, and more preferably less than 50, even more preferably less than 45 and preferably no more than 40 kW·min/m$^2$ and kW/m$^2$, respectively. The thermoplastic compositions of the invention that contain a poly(biphenyl ether sulfone) preferably have a lower THR and HRR in comparison to any polycarbonate or polyetherimide resin-containing compositions on a weight or molar weight basis. More preferably, the poly(biphenyl ether sulfone) thermoplastic compositions of the invention have a lower THR and HRR in comparison to unfilled polycarbonate or polyetherimide compositions or compositions filled with conventional fillers on either or both of a weight or molar basis.

Conventionally it is thought that the addition of inorganic fillers to thermoplastic compositions may lead to a reduction in the strength and physical properties of the thermoplastic composition. The thermoplastic compositions of the invention, especially compositions containing any of a poly(biphenyl ether sulfone) and a high crush strength hollow glass microparticle, have improved tensile strength, tensile strain, flexural stress and modulus of elasticity.

The thermoplastic compositions of the invention offer high strength, high stiffness, low specific gravity, better flammability than conventional foams, uniform pore size distribution and uniform void size distribution.

The base color of any plastic is an important determinant of whether the plastic is suitable for application in transparent or certain colored applications. A colored application includes any application wherein the thermoplastic composition is mixed with one or more dyes and/or pigments, in combination, optionally, with one or more additional colorless or colored components. The base color of a thermoplastic composition is the color measured on the thermoplastic composition before the addition of any additional component not already present in the thermoplastic composition derived from a manufacturing process (e.g., added as a part of the polymerization and subsequent extrusion to form pellets and a plaque for measuring color).

The thermoplastic compositions of the invention and compositions containing the poly(biphenyl ether sulfone)s of the invention undergo melt-fabrication at moderate conditions to provide molded and extruded articles having smooth and aesthetically pleasing surface characteristics. The conditions for molding, extruding, and thermoforming the poly(aryl ether sulfone)-containing thermoplastic compositions are well known in the art. Specific conditions may be found in the "RADEL A Polyethersulfone, RADEL R Polyphenylsulfone—Design Guide," from Solvay Advanced Polymers, R-50247, 2004, incorporated by reference herein in its entirety.

The thermoplastic compositions of the invention are advantageously readily pigmented in a wide range of colors, and are useful in a number of applications, in particular for the construction of various panels and parts for aircraft interiors.

The microparticle-containing thermoplastic compositions of the invention provide improved flow properties during processing in comparison to the flow and processing properties of thermoplastic compositions filled with conventional fillers. In addition, improved part morphology is seen for injection molded parts including parts made from thermoplastic blends of polymers. The hollow glass microspheres are more homogeneously dispersed within parts and form less surface blush than conventional fillers such as glass fibers.

Overall the poly(biphenyl ether sulfone) compositions provide a combination of improved thermal degradation properties (i.e., improved resistance to heat and flame), processing characteristics, and physical properties that are not practically attainable in conventional thermoplastic compositions.

Still other aspects of the present invention include:

a flying vehicle other than an aircraft, said flying vehicle comprising a component made from any composition as above described, in particular helicopters, hot-air balloons, gliders, and spatial rockets and shuttles;

the use of any composition as above described in an automotrice application;

an automotrice vehicle other than a flying vehicle, said automotrice vehicle comprising a component made from any composition as above described, in particular cars, motorbikes, trucks and vans; the inventive compositions may be especially useful notably to manufacture car components;

the use of an aircraft comprising an aircraft component made from any composition as above described for taking passengers and/or loading goods on board;

the use of an aircraft comprising an aircraft component made from any composition as above described for transporting passengers and/or goods;

the use of an aircraft comprising an aircraft component made from any composition as above described for disembarking passengers and/or unloading goods from said aircraft;

the use of any previously described automotrice vehicle other than a flying vehicle, for transporting passengers and/or goods.

Testing Methods

The testing methods employed to measure the values stated herein are as follows:

Average specific gravity—ASTM D 792-00;
Tensile properties, including tensile strength, tensile modulus and tensile elongation at break—ASTM D 638 (itself referenced in ASTM D 4745-01);
Flexural properties, including flexural strain, flexural stress and flexural modulus—ASTM D 790.
Initial and 15 second hardness—ASTM D 2240-04;
Shrinkage—ASTM D 4894-04;
Average crush strength—ASTM D 3102-72;
Compressive strength and compressive modulus—ASTM D 695-02;
Coefficient of thermal expansion (COTE)—ASTM D 831-03;
Average particle density—ASTM D 2840-69; and
Particle size distribution measured with a Coulter Counter LS-130.

Plaques of the thermoplastic compositions of the invention are tested for vertical ignition properties, smoke emission and toxic gas generation characteristics including determination of total heat release (e.g., THR and HRR). Acceptance criteria for smoke and toxicity are specified by Boeing Document D6-51377, Revision E, incorporated herein by reference.

A 60 second vertical ignition is conducted as described in FAR 25.853(a), Amendment 25-83, Appendix F, Part I, incorporated herein by reference. During the 60 second vertical ignition test, no dripping is observed and the time to extinguish is less than 1 second. The burn length of the three samples is an average of less than 5 inches. Values of the thermoplastic compositions of the invention may be compared with acceptable criteria defined as follows: maximum allowed time to extinguish=15 seconds, the maximum burned length=6 inches and the maximum allowed drip time to extinguish=3 seconds.

Heat release testing [commonly reported as Ohio State University (OSU) heat release testing] is conducted in accordance with FAR 25.853(d), Amendment 25-83, according to Appendix F, Part IV, incorporated herein by reference. The average value of peak heat release rate for the heat release rate testing according to FAR 25.853(d), Amendment 25-83, Appendix F, Part IV, as described in DOT/FAA/AR-00/12, as presented in the "Aircraft Materials Fire Test Handbook," dated April 2000, incorporated herein by reference, is used.

Smoke testing is performed according to FAR 25.853(d), Amendment 25-83, Appendix F, Part V and BSS 7238, Revision C, each of which is incorporated herein by reference.

Toxic gas generation is tested for BSS 7239, Revision A, incorporated herein by reference.

EXAMPLES

The following non-limiting examples were carried out in order to demonstrate the effects of the invention.

Set 1

Compositions comprising mixtures of a poly(biphenyl ether sulfone) and bisphenol A polysulfone were prepared using a 25 mm Berstorff extruder. Prior to undergoing extrusion, a pulverulent blend of all of the ingredients except for the glass microspheres was prepared. The pulverulent blend was fed at a rate of approximately 12-14 lb/hr with a feeding rate of microspheres adjusted so as to achieve a desired loading level. The extruder barrel temperature was 340° C. and a melt temperature of from 360-375° C.

The results of the examples are tabulated below in Table 1. Formulations A and B are inventive examples. Each of inventive formulations A and B included a mixture of poly(biphenyl ether sulfone) (RADEL® R-5600 from Solvay Advanced Polymers) and bisphenol A polysulfone (UDEL® P-3703 from Solvay Advanced Polymers) and hollow glass microspheres (iM30K from 3M Specialty Materials). "pph" means "parts per hundred"; the parts of questions are parts by weight, and they are based on the total weight of all the ingredients of the formulations, except the pigment.

TABLE 1

| Sample | Units | Comparative example | A | B |
|---|---|---|---|---|
| UDEL ® P-3703 bisphenol A polysulfone | pph | 18.5 | 16.7 | 14.8 |
| RADEL ® R-5600 polyphenylsulfone | pph | 76.3 | 68.6 | 61.0 |
| ZnO |  | 0.2 | 0.2 | 0.2 |
| Hollow glass microspheres (iM30K) | pph | 0 | 10 | 20 |
| MFA | pph | 5 | 4.5 | 4 |
| Total |  | 100 | 100 | 100 |
| TiO2 pigment |  | 4 | 4 | 4 |
| Properties |  |  |  |  |
| Specific Gravity | g/cm$^3$ | 1.32-1.36 | 1.20-1.24 | 1.09-1.13 |
| Tensile Strength @ Yield | psi | 9,950 | 10,300 | — |
| Tensile Strength @ Break | psi | 9,440 | 9,970 | 10,300 |
| Tensile Modulus of Elasticity | ksi | 318 | 395 | 463 |
| Flexural Strain @ Break | % | — | — | 3.31 |
| Flexural Stress @ 5% Strain | psi | 13,800 | 15,400 | — |
| Flexural Stress @ Break | psi | — | — | 13,200 |
| Flexural Modulus of Elasticity | ksi | 340 | 408 | 463 |

The data in the Table above show that the inclusion of hollow glass microspheres in poly(biphenyl ether sulfone) compositions results in a substantially lower density. The reduced density translates to weight savings in aircraft applications and provides a composition of substantially greater value on a weight basis. While conventionally it may be predicted that the inclusion of a filler would result in a loss of strength, e.g., a reduction in tensile strength, tensile elongation, flexural strain and/or modulus of elasticity, the inventive compositions containing hollow glass microspheres and a poly(biphenyl ether sulfone) are significantly and unexpectedly stiffer and stronger.

The smoke emission test shows that the thermoplastic compositions of the invention have an average value of less than 5. This compares to a maximum allowed average value for specific optical density of smoke of 200.

Testing of the copolymer of the invention generates 30 ppm of CO, 2 ppm of HCl, no $NO_x$ and no HCN were detected, 20 ppm of $SO_2$, and 10 ppm of HF. The specification, i.e., Boeing Document No. D6-51377, Revision E, Table 1, provides a maximum allowable toxic gas generation values in ppm for CO=3,500 ppm, HCl=500 ppm, $NO_x$=100 ppm, HCN=150 ppm, $SO_2$=100 ppm and HF=200 ppm.

Each of the sample plaques meets the requirements for 60 second vertical ignition burn, heat release, smoke emission, and toxic gas emission defined in the above-mentioned tests and/or Boeing Document Nos. In particular, concerning the 60 second vertical ignition burn test (the so-called "Underwriters Laboratories 94 vertical burn screening test"), the best level of performance, qualified as "V-0", is outstandingly achieved with 1/32" thick plaques (also sometimes referred to as "bars") made from the inventive compositions.

Set 2

Compositions comprising mixtures of a poly(biphenyl ether sulfone) and a poly(etheretherketone) were prepared using a 25 mm Berstorff extruder (subset 2-1). Other compositions comprising mixtures of a poly(biphenyl ether sulfone) and a bisphenol A polysulfone were prepared using the same extruder (subset 2-2). Prior to undergoing extrusion, pulverulent blends of all of the ingredients except for the glass microspheres were prepared. The pulverulent blends were fed at a rate of approximately 15-20 lb/hr with a feeding rate of microspheres adjusted so as to achieve a desired loading level. The extruder barrel temperatures were 320-340° C. and a melt temperature of from 375-390° C.

Subset 2-1

The results of this first subset are tabulated below in Table 2. All three formulations C, D and E are inventive examples. Each of them included a mixture of poly(biphenyl ether sulfone) (RADEL® R-5800 polyphenylsulfone from Solvay Advanced Polymers) and poly(etheretherketone) (VICTREX® 150P PEEK from ICI VICTREX), and hollow glass microspheres (iM30K from 3M Specialty Materials). "pph" means "parts per hundred"; the parts of questions are parts by weight, and they are based on the total weight of all the ingredients of the formulations, except the pigment.

TABLE 2

| Sample | Units | C | D | E |
|---|---|---|---|---|
| RADEL ® R-5800 polyphenylsulfone | pph | 62.2 | 60.2 | 56.9 |
| VICTREX ® 150P PEEK | pph | 33.4 | 32.4 | 30.7 |
| Hollow glass microspheres (iM30K) | pph | 2 | 5 | 10 |
| Melt processible PTFE | pph | 1.4 | 1.4 | 1.4 |
| Zinc borate | | 1.0 | 1.0 | 1.0 |
| Total | | 100 | 100 | 100 |
| TiO2 pigment | | 2 | 2 | 2 |
| Properties | | | | |
| Specific Gravity | g/cm$^3$ | 1.29 | 1.27 | 1.23 |
| Tensile Strength @ Yield | psi | 11,100 | 11,300 | — |
| Tensile Strength @ Break | psi | 8,600 | 10,400 | 11,300 |
| Tensile Modulus of Elasticity | ksi | 373 | 411 | 457 |
| Flexural Stress @ 5% Strain | psi | 16,400 | 17,200 | 17,900 |
| Flexural Modulus of Elasticity | ksi | 414 | 449 | 484 |
| Flammability | | | | |
| OSU 2 min heat release | (kW-min/m$^2$) | | About 0 | |
| OSU Maximum heat release rate | kW/m$^2$ | | From about 35 to about 45 | |

The data in Table 2 confirm that the inclusion of hollow glass microspheres in poly(biphenyl ether sulfone) compositions results in a substantially lower density, including in the presence of engineering polymers other than poly(aryl ether sulfone)s such as PEEK. Surprisingly, it is also confirmed that the higher the hollow glass microspheres content of the inventive compositions is, the stiffer and the stronger the inventive compositions are.

All three inventive compositions exhibit excellent flame retardance, as evidenced by OSU testing. Indeed, to pass this test successfully based on the most recent airworthiness standards enacted in 1990, the samples must have a OSU total heat release rate at 2 min of at below 65 kW·min/m$^2$ and a OSU maximum heat release rate of below 65 kW/m$^2$; for the inventive compositions, both measured values are well below the stated upper limits. The data show further that hollow glass microspheres do not seem to have any significant (positive or negative) effect on the flame retardance properties of the inventive compositions.

Subset 2-2

The results of this other subset are tabulated below in Table 3. All three formulations F, G and H are inventive examples. Each of them included a mixture of poly(biphenyl ether sulfone) (RADEL® R-5200 polyphenylsulfone from Solvay Advanced Polymers) and bisphenol A polysulfone (UDEL® P-1800 bisphenol A polysulfone from Solvay Advanced Polymers), and hollow glass microspheres (iM30K from 3M Specialty Materials). "pph" means "parts per hundred"; the parts of questions are parts by weight, and they are based on the total weight of all the ingredients of the formulations, except the pigment.

TABLE 3

| Sample | Units | F | G | H |
|---|---|---|---|---|
| RADEL ® R-5200 polyphenylsulfone | pph | 65.9 | 63.8 | 60.5 |
| UDEL ® P-1800 bisphenol A polysulfone | pph | 28.2 | 27.4 | 25.9 |
| Hollow glass microspheres (iM30K) | pph | 2 | 5 | 10 |
| Melt processible PTFE | pph | 2.9 | 2.85 | 2.7 |
| Zinc borate | | 1.0 | 0.95 | 0.9 |
| Total | | 100 | 100 | 100 |
| TiO2 pigment | | 2 | 2 | 2 |
| Properties | | | | |
| Specific Gravity | g/cm$^3$ | 1.28 | 1.26 | 1.23 |
| Tensile Strength @ Yield | psi | 10,000 | 10,200 | — |
| Tensile Strength @ Break | psi | 7,800 | 8,600 | 9,500 |
| Tensile Modulus of Elasticity | ksi | 337 | 368 | 409 |
| Flexural Stress @ 5% Strain | psi | 14,600 | 15,400 | 15,800 |
| Flexural Modulus of Elasticity | ksi | 377 | 407 | 449 |
| Flammability | | | | |
| OSU 2 min heat release | (kW-min/m$^2$) | | About 10 | |
| Maximum heat release rate | kW/m$^2$ | | From about 35 to about 45 | |

The data in Table 3 confirm that the inclusion of hollow glass microspheres in poly(biphenyl ether sulfone) compositions results in a substantially lower density, including when another poly(aryl ether sulfone), such as bisphenol A polysulfone, is present. Surprisingly, it is also confirmed that the higher the hollow glass microspheres content of the inventive compositions is, the stiffer and the stronger the inventive compositions are.

Again, all three inventive compositions exhibit excellent flame retardance, as evidenced by OSU testing, and hollow glass microspheres do not appear to have any (positive or negative) significant effect on the flame retardance properties of the inventive compositions.

In comparison to foamed compositions, the microparticle-filled thermoplastic compositions of the invention provide substantially better flame resistance and flame retardance properties. Conventional foamed poly(biphenyl ether sulfone)s will drip sooner and have less desirable flame test properties in comparison to the PPSU compositions of the invention.

Obviously, numerous modifications and variations of the present invention are possible in light of the above teachings. It is therefore to be understood that within the scope of the appended claims, the invention may be practiced otherwise than as specifically described herein.

The invention claimed is:
1. A composition, comprising:
one or more poly(biphenylether sulfone)s and a plurality of microspheres dispersed in the poly(biphenylethersulfone)s,
wherein the poly(biphenylether sulfone)s comprise at least 50% by weight based on the weight of the poly(biphenylether sulfone)s of recurring units consisting of at least one optionally substituted p-biphenylene unit, at least one ether unit and a sulfone unit,
and wherein said microspheres are hollow glass microspheres that have a crush strength of from 20,000 to 50,000 psi.
2. The composition of claim 1, wherein the poly(biphenylether sulfone)s comprise recurring units consisting of a biphenyl diphenol group and a diphenyl sulfone group and having formula (I)

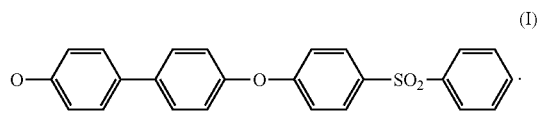

3. The composition of claim 1, comprising from 50 to 99% by weight of the poly(biphenylether sulfone)s and from 1 to 50% by weight of the microspheres based upon the total weight of the composition.
4. The composition of claim 1, comprising from 5 to 30% by weight of the microspheres based upon the total weight of the poly(biphenylether sulfone)s and the microspheres.
5. The composition of claim 1, wherein the hollow glass microspheres have an average particle diameter of from 20 to 150 μm and a density of from 0.1 to 1 g/cm³.
6. A composition, comprising:
one or more poly(aryl ether sulfone)s and hollow glass microspheres having an average crush strength of at least 20,000 psi according to ASTM D 3102-72.
7. The composition of claim 6, wherein at least 95% by weight of the total weight of the poly(aryl ether sulfone)s are poly(biphenylether sulfone)s.
8. The composition of claim 6, wherein the hollow glass microspheres have an average particle density of from 0.4 to 0.8 g/cm³ according to ASTM D 2840-69.
9. The composition of claim 6, wherein at least 95% of the hollow glass microspheres have an average particle diameter of less than 150 μm.
10. A composition, comprising:
(i) one or more of a polyetherimide and a polycarbonate, and
(ii) hollow glass microspheres having an average crush strength of at least 20,000 psi according to ASTM D 3102-72.
11. The composition of claim 10, comprising a polycarbonate/siloxane copolymer.
12. The composition of claim 10, wherein the hollow glass microspheres have an average particle density of from 0.4 to 0.8 g/cm³ according to ASTM D 2840-69.
13. The composition of claim 10, wherein at least 95% of the hollow glass microspheres have an average particle diameter of less than 150 μm.
14. An article made from the composition of claim 1.
15. The article according to claim 14, which is an aircraft component.
16. A method for making an article for an aeronautical or automotrice application comprising utilizing the composition of claim 1.
17. The article according to claim 14, in an aircraft application, which is selected from the group consisting of a passenger service unit, a staircase, a window reveal, a ceiling panel, an information display, a window cover, a sidewall panel, a wall partition, a display case, a mirror, a sun visor, a window shade, a storage bin, a storage door, a ceiling overhead storage locker, a serving tray, a seat back, a cabin partition, and a duct.
18. An article made from the composition of claim 6, which is an aircraft component.
19. An article made from the composition of claim 10, which is an aircraft component.
20. The composition of claim 6, wherein said hollow glass microspheres have an average crush strength of 20,000-50,000 psi.
21. The composition of claim 10, wherein said hollow glass microspheres have an average crush strength of 20,000-50,000 psi.

* * * * *